(12) United States Patent
Pun et al.

(10) Patent No.: US 7,692,682 B2
(45) Date of Patent: Apr. 6, 2010

(54) VIDEO ENCODING IN A VIDEO CONFERENCE

(75) Inventors: Thomas Pun, San Jose, CA (US); Hsi Jung Wu, Sunnyvale, CA (US); Hyeonkuk Jeong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1274 days.

(21) Appl. No.: 11/118,615

(22) Filed: Apr. 28, 2005

(65) Prior Publication Data

US 2006/0244819 A1 Nov. 2, 2006

(51) Int. Cl.
H04N 7/15 (2006.01)
(52) U.S. Cl. .................................... 348/14.08
(58) Field of Classification Search ............. 348/14.08, 348/14.09, 14.01, 14.12, 14.14, 14.15
See application file for complete search history.

(56) References Cited

U.S. PATENT DOCUMENTS

| 4,441,151 A | 4/1984 | Hayashibe |
| 4,558,430 A | 12/1985 | Magomi et al. |

(Continued)

FOREIGN PATENT DOCUMENTS

EP 750236 12/1996

(Continued)

OTHER PUBLICATIONS

Final Rejection of 11/118,554, (mailing date) Dec. 12, 2008, Thomas Pun, et al.

(Continued)

*Primary Examiner*—Stella L Woo
(74) *Attorney, Agent, or Firm*—Adeli & Tollen LLP

(57) ABSTRACT

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

39 Claims, 33 Drawing Sheets

U.S. PATENT DOCUMENTS

| | | | |
|---|---|---|---|
| 4,602,326 | A | 7/1986 | Kraus |
| 4,847,829 | A | 7/1989 | Tompkins et al. |
| 5,319,682 | A | 6/1994 | Clark |
| 5,604,738 | A | 2/1997 | Shibata et al. |
| 5,826,083 | A | 10/1998 | Prasad |
| 5,838,664 | A * | 11/1998 | Polomski ................ 348/14.09 |
| 5,896,128 | A | 4/1999 | Boyer |
| 5,933,417 | A | 8/1999 | Rottoo |
| 5,953,049 | A | 9/1999 | Horn et al. |
| 5,964,842 | A | 10/1999 | Packard |
| 6,167,432 | A | 12/2000 | Jiang |
| 6,311,224 | B1 | 10/2001 | Packard |
| 6,487,578 | B2 | 11/2002 | Ranganathan |
| 6,496,216 | B2 | 12/2002 | Feder |
| 6,629,075 | B1 | 9/2003 | Schalkwk |
| 6,633,985 | B2 | 10/2003 | Drell |
| 6,697,341 | B1 | 2/2004 | Roy |
| 6,697,476 | B1 | 2/2004 | O'Malley |
| 6,728,221 | B1 | 4/2004 | Shaffer et al. |
| 6,744,460 | B1 | 6/2004 | Nimri |
| 6,757,005 | B1 | 6/2004 | Elbaz |
| 6,760,749 | B1 | 7/2004 | Dunlap |
| 6,882,971 | B2 | 4/2005 | Craner |
| 6,989,856 | B2 | 1/2006 | Firestone et al. |
| 7,096,037 | B2 | 8/2006 | Canova, Jr. et al. |
| 7,266,091 | B2 | 9/2007 | Singh et al. |
| 7,321,382 | B2 | 1/2008 | Okajima et al. |
| 7,474,326 | B2 | 1/2009 | Le Pennec |
| 2001/0019354 | A1* | 9/2001 | Einarsson et al. ........ 348/14.09 |
| 2002/0126626 | A1 | 9/2002 | Singh et al. |
| 2004/0028199 | A1 | 2/2004 | Carlson |
| 2004/0233990 | A1 | 11/2004 | Sekiguchi et al. |
| 2004/0257434 | A1 | 12/2004 | Davis et al. |
| 2005/0018828 | A1 | 1/2005 | Nierhaus et al. |
| 2005/0099492 | A1 | 5/2005 | Orr |
| 2005/0286443 | A1 | 12/2005 | McMillen et al. |
| 2006/0029092 | A1 | 2/2006 | Luo et al. |
| 2006/0244812 | A1 | 11/2006 | Jeong et al. |
| 2006/0244816 | A1 | 11/2006 | Jeong et al. |
| 2006/0245377 | A1 | 11/2006 | Jeong et al. |
| 2006/0245378 | A1 | 11/2006 | Jeong et al. |
| 2006/0245379 | A1 | 11/2006 | Abuan et al. |
| 2006/0247045 | A1 | 11/2006 | Jeong et al. |

FOREIGN PATENT DOCUMENTS

| | | |
|---|---|---|
| EP | 1875769 | 1/2008 |
| EP | 1877148 | 1/2008 |
| EP | 1878229 | 1/2008 |
| EP | 1936996 | 6/2008 |
| WO | WO 2004030369 | 4/2004 |
| WO | WO 2006116644 | 11/2006 |
| WO | WO 2006116659 | 11/2006 |
| WO | WO 2006116750 | 11/2006 |

OTHER PUBLICATIONS

International Preliminary Report on Patentability and Written Opinion of PCT/US2006/016169, (mailing date) Dec. 11, 2008, Apple Computer Inc.

International Search Report and Written Opinion of PCT/2006/016123, (mailing date) Sep. 28, 2008, Apple Computer, Inc.

Restriction Requirement of 11/118,553, (mailing date) Oct. 7, 2008, Jeong, Hyeonkuk, et al.

Non Final Rejection of 11/118,554, (mailing date) Feb. 21, 2008, Thomas Pun, et al.

Non-Final Rejection of 11/118,555, (mailing date) Jun. 25, 2008, Hyeonkuk Jeong, et al.

International Preliminary Report on Patentability and Written Opinion for PCT/US2006/016469, (mailing date) Oct. 30, 2007, Apple Computer, Inc.

Wong et al., "PID-based Real-time Rate Control", Jun. 2004, IEEE Conference on Multimedia and Expo, vol. 1, pp. 221-224.

Zhanjun et al., "The Guarantee of QoS for Wireless Multimedia Streams Based on Adaptive Session", Dec. 2000, IEEE International, Conference on Personal Wireless Communications, pp. 283-287.

International Search Report and Written Opinion of PCT/US2006/016169, (mailing date) Oct. 16, 2008, Apple Computer Inc.

Non-Final Office Action of 11/118,931, (mailing date) Feb. 3, 2009, Jeong, Hyeonkuk, et al.

Non-Final Office Action of 11/118,932, (mailing date) Apr. 29, 2009, Abuan, Joe, et al.

Non-Final Office Action of 11/118,555, (mailing date) Feb. 12, 2009, Jeong, Hyeonkuk, et al.

Non-Final Office Action of 11/118,297, (mailing date) Jan. 27, 2009, Jeong, Hyeonkuk, et al.

Non-Final Office Action for 11/118,553, (mailing date) Feb. 4, 2009, Jeong, Hyeonkuk, et al.

International Preliminary Report on Patentability for PCT/US2006/016123, (mailing date) May 7, 2009, Apple Computer, Inc.

U.S. Appl. No. 10/877,507, filed Jun. 25, 2004, Bruce Arthur, et al.

International Search Report of PCT Application PCT/US2006/016469, Apple Computer, Inc., Sep. 18, 2006.

Written Opinion of the International Searching Authority of PCT Application PCT/US2006/016469, Apple Computer, Inc., Sep. 18, 2006.

\* cited by examiner

Pixels and sub images are not drawn to scale

VIDEO ENCODING IN A VIDEO CONFERENCE

CROSS REFERENCE TO RELATED APPLICATIONS

This Application is related to the following applications: U.S. patent application Ser. No. 11/118,931, filed Apr. 28, 2005; U.S. patent application Ser. No. 11/118,554, filed Apr. 28, 2005; U.S. patent application Ser. No. 11/118,932, filed Apr. 28, 2005; U.S. patent application Ser. No. 11/118,555, filed Apr. 28, 2005; U.S. patent application Ser. No. 11/118,297, filed Apr. 28, 2005; and U.S. patent application Ser. No. 11/118,553, filed Apr. 28, 2005.

FIELD OF THE INVENTION

The present invention relates to video processing in a multi-participant video conference.

BACKGROUND OF THE INVENTION

With proliferation of general-purpose computers, there has been an increase in demand for performing video conferencing through personal or business computers. Establishing such a conference, however, creates significant challenges in how to transfer data between participants. Prior solutions require large amount of data to be exchanged, which consumes a lot of computing resources as well as a lot of bandwidth.

Due to these resources and bandwidth limitations, general-purpose computers that are readily available for use in home and offices have not been able to perform video conferencing effectively and inexpensively. Therefore, there is a need in the art for a video conferencing architecture that uses an efficient method for transmitting data between video-conference participants. Such an approach would allow the video conference to be conducted thru commonly available network connections.

SUMMARY OF THE INVENTION

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

Several detailed embodiments of the invention are described below. In these embodiments, the central distributor is the computer of one of the participants of the video conference, and the images that are transmitted to and from the central distributor are video frames. One of ordinary skill in the art will realize that other embodiments are implemented differently. For instance, the central distributor in some embodiments is not the computer of any of the participants of the video conference. Also, in some embodiments, the images transmitted to and from the central distributor are not video frames (e.g., the images might be fields that comprise a frame, or some other video image representation).

I. Overview

Figure 1:
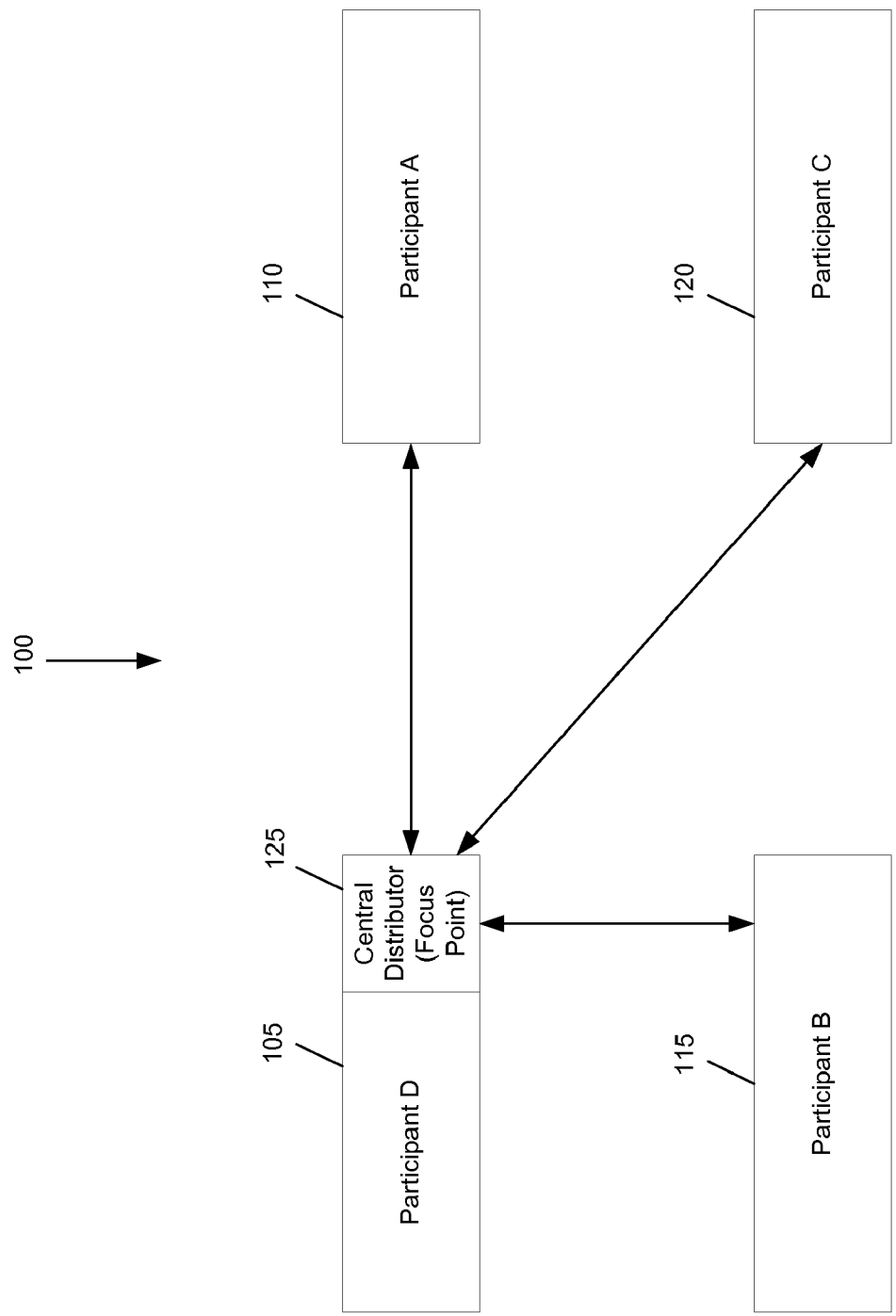
FIG. 1 illustrates an example of the video conference architecture of some embodiments of the invention.

FIG. 1 illustrates an example of the video conference architecture 100 of some embodiments of the invention. This architecture allows multiple participants to engage in a video conference. In the example illustrated in FIG. 1, four participants A, B, C, and D are engaged in the video conference through their four computers 105-120 and a network (not shown) that connects these computers. The network that connects these computers can be any network, such as a local area network, a wide area network, a network of networks (e.g., the Internet), etc.

During the video conference, the computer 105 of one of the participants participant D in this example) serves as a central distributor of audio/video content, as shown in FIG. 1. This central distributor 125 will be referred to below as the focus point of the multi-participant conference. The computers of the other participants will be referred to below as non-focus machines or non-focus computers.

Also, the discussion below focuses on the video operations of the focus and non-focus computers. The audio operations of these computers are further described in U.S. patent application Ser. No. 11/118,555, entitled "Audio Processing in a Multi-Participant Conference", filed concurrently with this application. In addition, U.S. patent application Ser. No. 11/118,931, entitled "Multi-Participant Conference Setup", filed concurrently with this application, describes how some embodiments set up a multi-participant video conference through a focus-point architecture, such as the one illustrated in FIG. 1. Both these applications are incorporated herein by reference.

Figure 2:
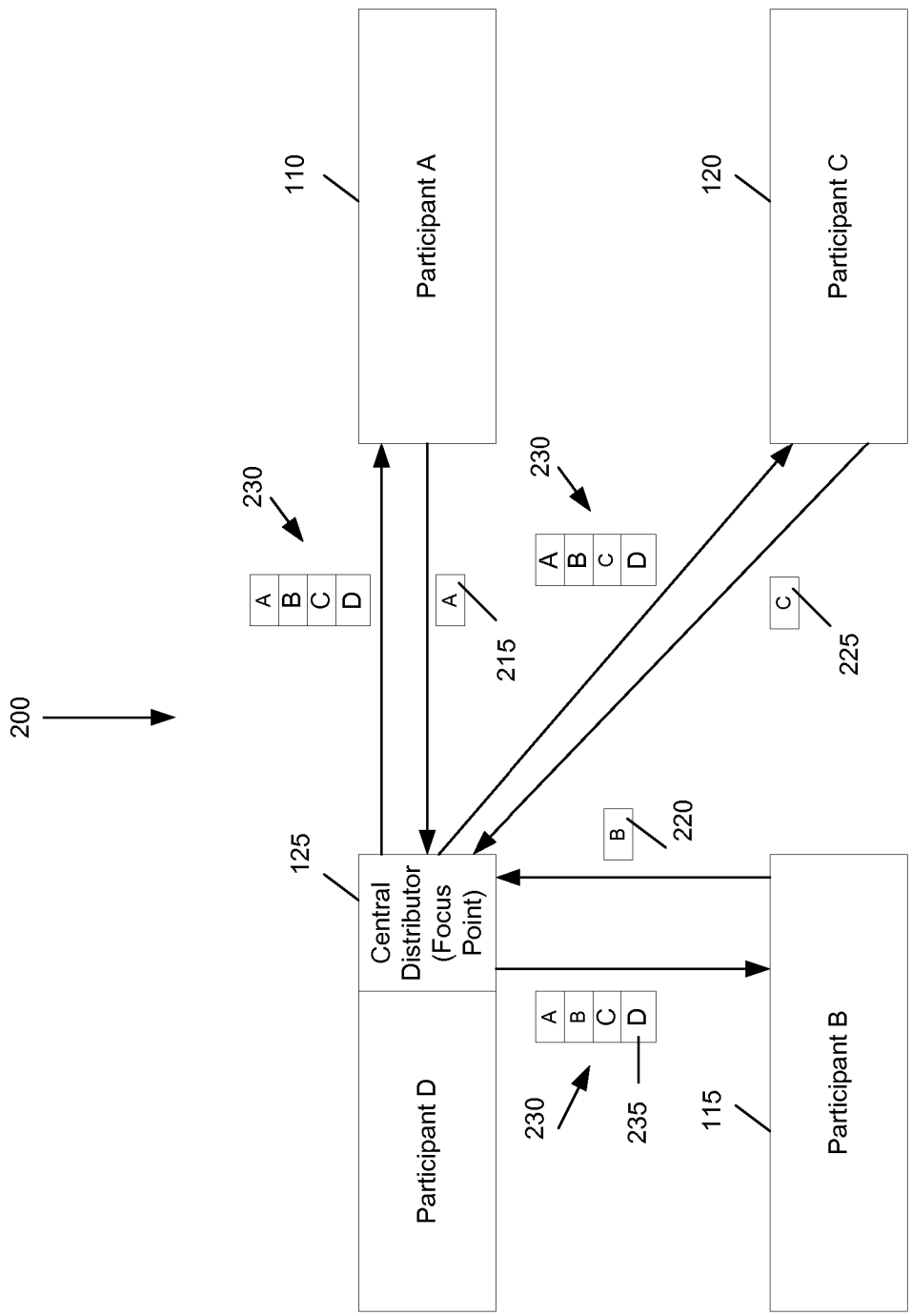
FIGS. 2 and 3 illustrate how some embodiments exchange video content in a multi-participant video conference.

As the central distributor of audio/video content, the focus point 125 receives video images from each participant, composites and encodes these images, and then transmits the composite images to each of the non-focus machines. FIG. 2 shows an example of such an image exchange for the four participant example of FIG. 1. Specifically, FIG. 2 illustrates the focus point 125 receiving one video frame 215-225 from each participant. From the received images 215-225, the focus point 125 generates a composite frame 230 that includes each of the received frames and a frame 235 of the focus-point participant D. The focus point 125 then transmits the composite frame 230 to each non-focus machine 110, 115, and 120.

In the example illustrated in FIG. 2, the composite frame 230 that is transmitted to each particular non-focus participant also includes the video frame of the particular non-focus participant. In some embodiments, however, the focus point removes a particular non-focus participant's image from the composite image that the focus point transmits to the particular non-focus participant. The focus point 125 removes each participant's own image from its corresponding composite image in order to save bandwidth.

Figure 3:
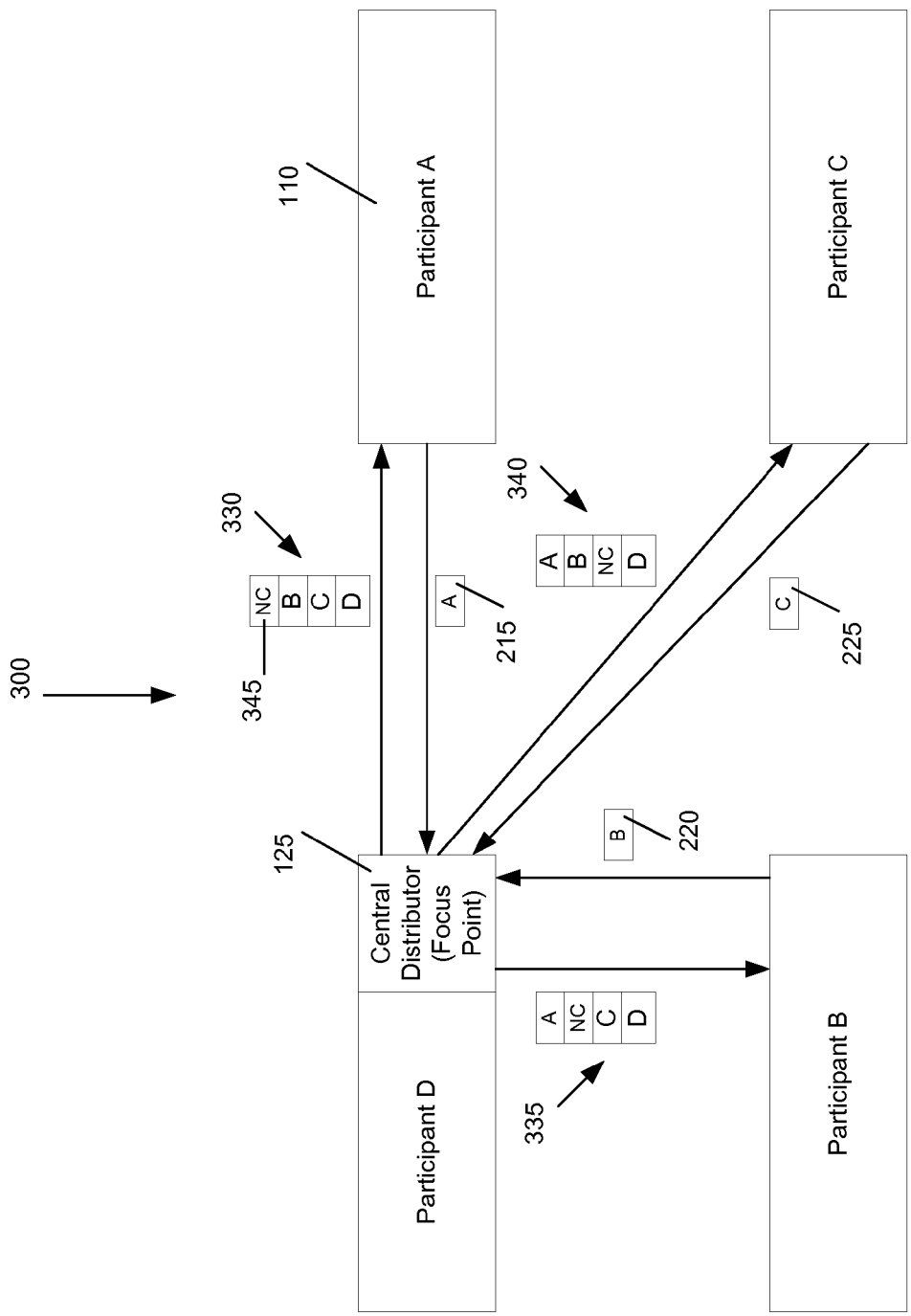

FIG. 3 illustrates an example of this removal for the example illustrated in FIG. 2. Specifically, FIG. 3 illustrates (1) for participant A, a composite image 330 that does not have participant A's own image 215, (2) for participant B, a composite image 335 that does not have participant B's own image 220, and (3) for participant C, a composite image 340 that does not have participant C's own image 225.

FIG. 3 also illustrates that instead of a non-focus participant's own image, some embodiments insert an empty-field flag 345 in the location of the non-focus participant's image in the composite image 330. This flag indicates the absence of the sub-image corresponding to the non-participant's own image. Since the size of this indicator 345 is much smaller than the size of non-focus participant's image, the removal of a particular non-focus participant's image from this participant's composite image reduces the amount of bandwidth used by the composite image. Some embodiments do not use the empty-field flag 345, and instead simply remove the image of a particular non-focus participant from the composite image sent to the particular non-focus participant. For instance, in some embodiments, the non-focus point module's decoder determines how the video image is composed with remaining encoded sub images because each encoded macroblock in each image has an identifier that represents its location.

Figure 4:
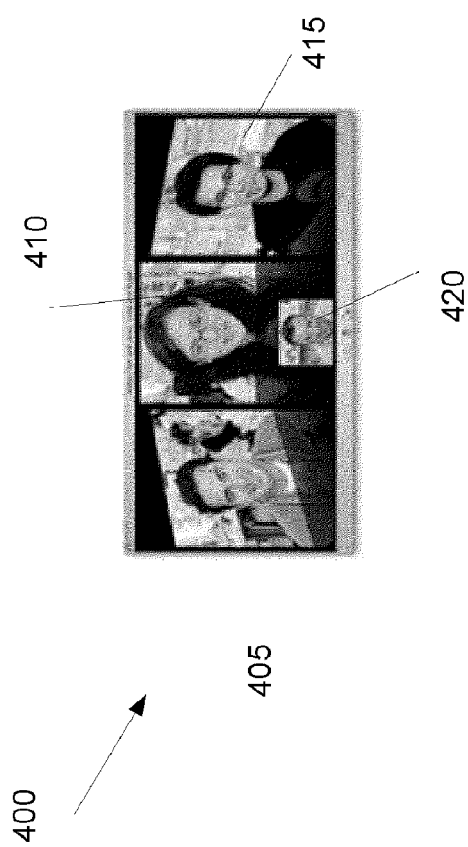
FIG. 4 shows an exemplary arrangement of participants' images on one of the participants' display.

Once each non-focus machine receives its encoded composite image, the non-focus machine decodes the composite image, extracts each of the sub-images in the composite image and then displays the decoded, extracted images on its display. FIG. 4 illustrates an example of such a display for the case of four participants in a video conference. As shown in FIG. 4, the images 405-415 of the three other participants are displayed horizontally on the participant's computer display 400. The local participant's own image 420 is displayed with a smaller size relative to the other participants' images 405-415 and is located on the bottom of the display 400.

Figure 5:
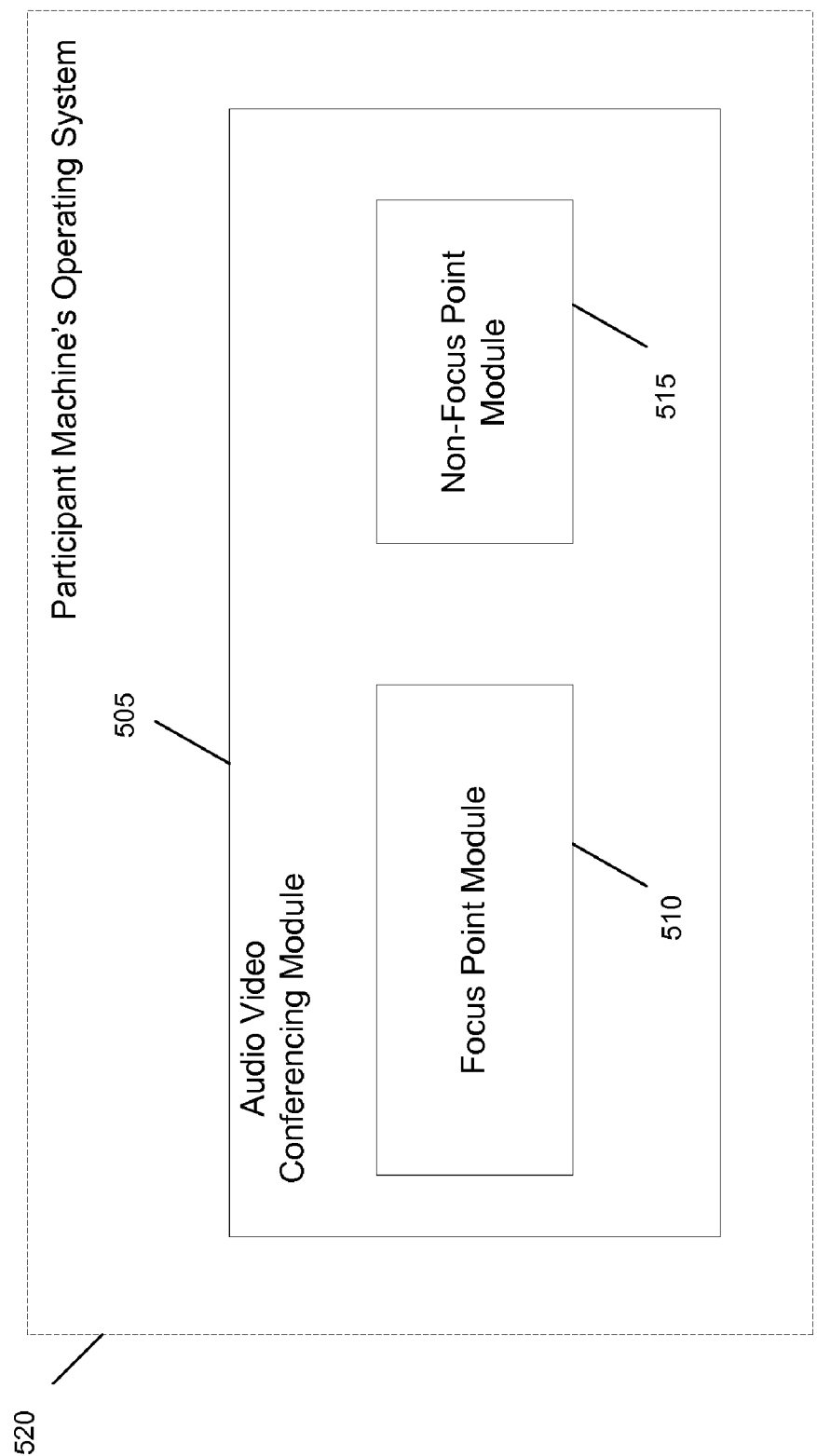
FIG. 5 shows the software components of the video conferencing application of some embodiments of the invention.

Some embodiments are implemented by a video conference application that can perform both focus and non-focus point operations. FIG. 5 illustrates the software architecture for one such application. Specifically, this figure illustrates a video conference application 505 that has two modules, a focus-point module 510 and a non-focus point module 515. Both these modules 510 and 515, and the video conference application 505, run on top of an operating system 520 of a video-conference participant's computer.

During a multi-participant video conference, the video conference application 505 uses the focus-point module 510 when this application is serving as the focus point of the conference, or uses the non-focus point module when it is not serving as the focus point. The focus-point module 510 performs focus-point video-processing operations when the video conference application 505 is the focus point of a multi-participant video conference. On the other hand, the non-focus point module 515 performs non-focus point, video-processing operations when the application 505 is not the focus point of the conference. In some embodiments, the focus and non-focus point modules 510 and 515 share certain resources.

The focus-point module 510 is described in Section II of this document, while the non-focus-point module 515 is described in Section III.

II. The Focus-Point Module

Figure 6:
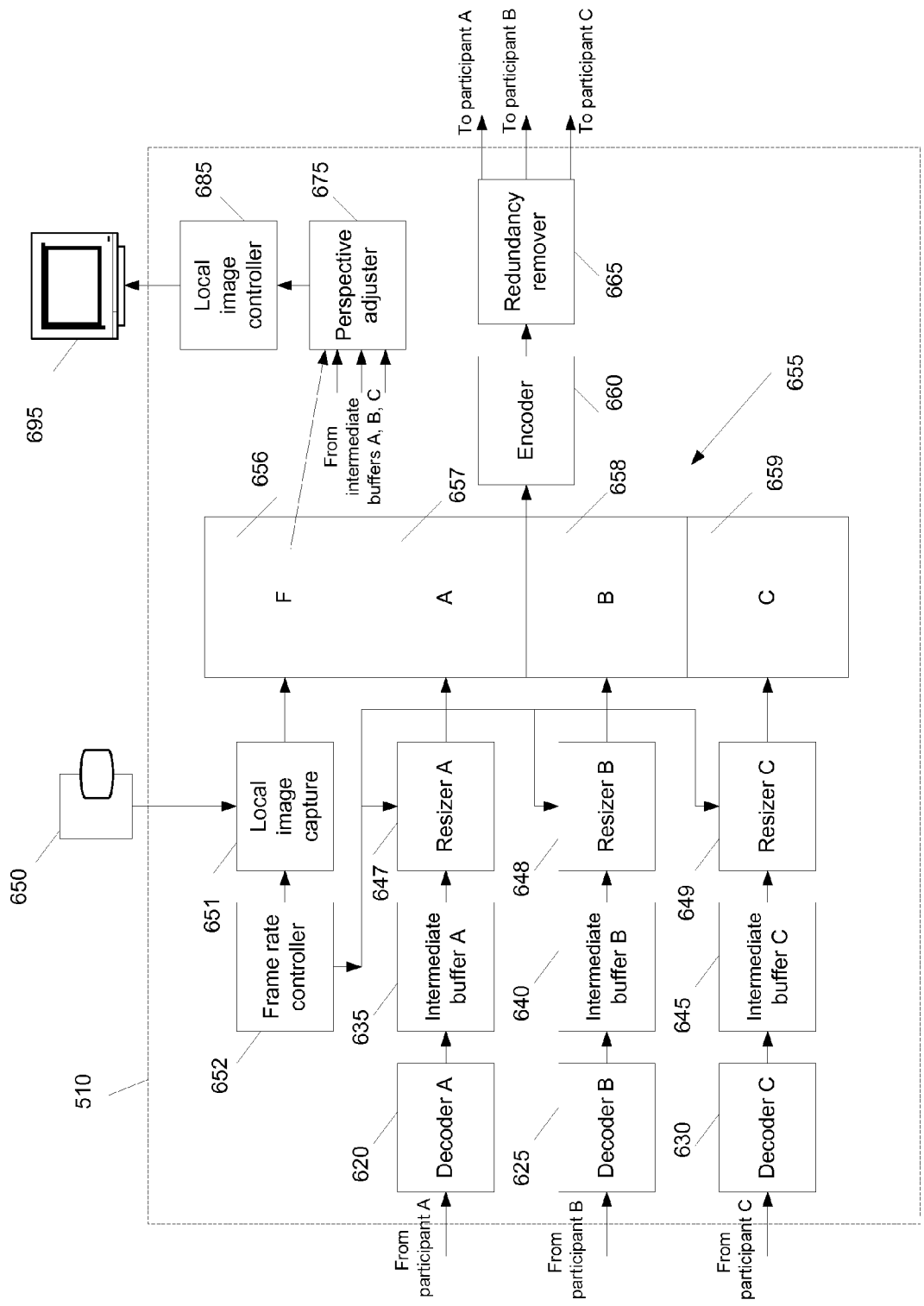
FIG. 6 illustrates the focus-point module of some embodiments of the invention.

FIG. 6 illustrates the focus-point module 510 of some embodiments of the invention. In this example, the focus-point module 510 is shown during a video conferencing with four participants, three non-focus participants and one focus participant. Specifically, FIG. 6 shows focus-point module 510 as utilizing three decoders 620-630, three intermediate buffers 635-645, three resizers 647-649, a local image capture module 651, a frame rate controller 652, a composite image buffer 655, an encoder 660, a redundancy remover 665, a perspective adjuster 675, and a local image controller 685.

The decoders 620-630, the intermediate buffers 635-645, and the resizers 647-649 form three video decoding pipelines into three sections 657-659 of the composite image buffer 655. These three video decoding pipelines allow the focus-point module 510 to decode and composite video signals from up to three participants during a video conference.

Specifically, each decoder 620, 625, or 630 is responsible for decoding video signals from one non-focus computer during a video conference. For the example illustrated in FIG. 1, FIG. 6 illustrates the decoder 620 receiving video signals from participant A's computer, the decoder 625 receiving video signals from participant B's computer, and the decoder 630 receiving video signals from participant C's computer. After decoding a received frame, each decoder 620, 625, or 630 stores the decoded frame in an intermediate buffer 635, 640, or 645. In some embodiments, each intermediate buffer is a location in the memory of the focus-point computer.

At a particular frame sampling rate, each resizer 647, 648, or 649 (1) retrieves a frame that is stored in its corresponding intermediate buffer, (2) resizes this frame, if such resizing is necessary, and (3) stores the frame in its corresponding section in the composite image buffer 655. For instance, the resizer 648 retrieves a decoded frame of the participant B from the intermediate buffer 640, resizes this retrieved frame if necessary, and stores this frame in the composite-buffer section 658.

The frame rate controller 652 defines the frame sampling rate at which the resizers 647-649 retrieve frames from the intermediate buffers 635-645. The frame rate controller 652 determines this rate based on a variety of factors, which may include the system bandwidth, the computational resources of the focus-point computer, the number of participants in the video conference, etc. At the frame sampling rate that the controller 652 supplies to the resizers 647-649, the frame rate controller 652 also directs the local image capture module 651 to store frames in section 656 of the composite image buffer 655. These stored frames are the images of the video-conference participant who is using the focus-point computer during the video conference. These images are captured by the camera 650 and the local image capture module 651 at the focus-point computer. In some embodiments, the frame rate controller 652 changes the particular frame rate during a video conference, as the conditions of the video conference change.

As mentioned above, the resizers 647-649 retrieve frames from the buffers 635-645 based on the frame rate they receive from the controller 652. Before storing a retrieved frame in the composite image buffer, a resizer resizes the retrieved frame when the non-focus computer that supplied this frame supplied it at a different size than the size of the composite-buffer section for this frame. For instance, to save bandwidth or computational resources during the encoding, a non-focus computer might encode and transmit smaller frames (i.e., encode frames at coarser level of granularity and transmit packets with less encoded content for each frame).

Also, as mentioned above, the resizers 647-649 store potentially-resized frames in their corresponding sections 657-659 of the composite image buffer 655. In some embodiments, the composite image buffer 655 is a location in the memory of the focus-point computer, and each section 656-659 in this buffer is a contiguous logical section at this location in the memory.

At the sampling rate that the controller 652 defines, the encoder 660 encodes the composite frame that is stored in the composite image buffer. The encoder encodes the sub-frame that is stored in each section 656, 657, 658, or 659 independently of the sub-frames that are stored in the other sections of the composite image buffer 655.

Figure 7:
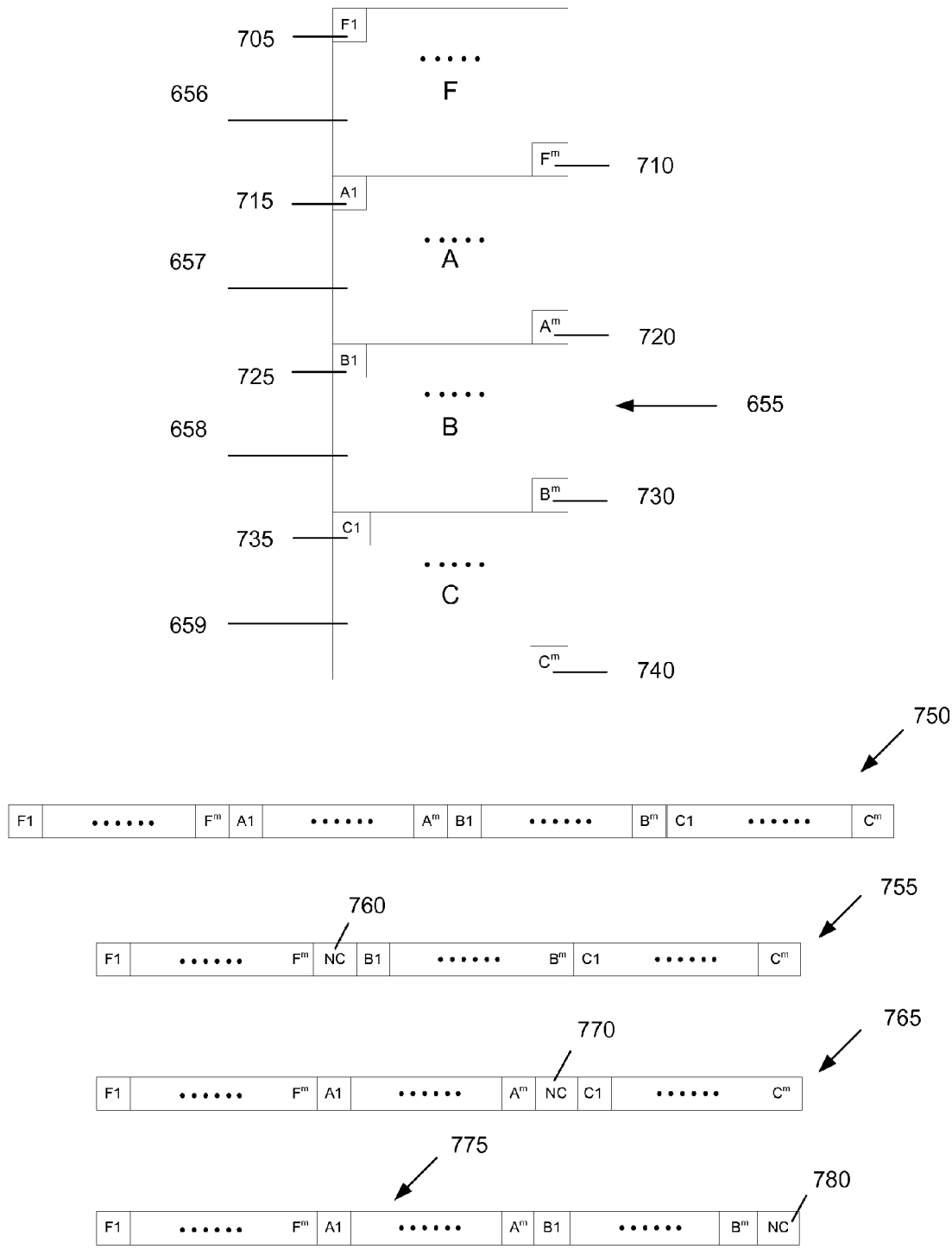
FIG. 7 shows the composite video data and video streams that the focus-point module of some embodiments produces.

To illustrate this, FIG. 7 presents a diagram that summarizes the encoding of a composite frame. Specifically, this figure illustrates the four sections 656-659 of the composite image buffer 655. For the encoding, the sub-frames in the section 656-59 are divided into sets of pixels. For instance, in some embodiments, each sub-frame is divided into a set of macroblocks, which are then intra-encoded without reference to any other frame's macroblock, or are inter-encoded by reference to another frame's macroblock. FIG. 7 illustrates the dividing of the sub-frame in section 656 into several macroblocks 705-710, the dividing of the sub-frame in section 657 into several macroblocks 715-720, the dividing of the sub-frame in section 658 into several macroblocks 725-730, and the dividing of the sub-frame in section 659 into several macroblocks 735-740.

As indicated above, the encoder 660 decouples the encoding of each sub-frame in each section 656, 657, 658, or 659 so that the encoding of each sub-frame does not depend on any other sub-frame (i.e., the encoding of one section does not use video data beyond the boundaries of each section). For example, the encoding of the macroblocks in the sub-frame of participant A in section 657 does not depend on the encoding of the macroblocks in the sub-frame of participant B in the section 658. This encoding is further described below.

After encoding a composite frame, the encoder 660 supplies the redundancy remover with an encoded video stream that contains each participant's encoded video data in a separate section (i.e., contains different participants encoded video data in separate, non-interleaved sections). For instance, FIG. 7 illustrates an encoded video stream 750 that includes encoding data for each intra-encoded or inter-encoded macroblock of the composite frame. In this composite stream 750, the encoded data for each sub-frame is not interleaved with the encoded data of any other sub-frame, as shown in FIG. 7.

This non-interleaved structure of the encoded stream allows the redundancy remover to remove quickly a particular non-focus participant's video data from the video stream that is to be transmitted to the particular non-focus participant. For instance, FIG. 7 illustrates (1) for participant A, a video stream 755 that has participant A's encoded video data replaced with a empty-field flag 760, (2) for participant B, a video stream 765 that has participant B's encoded video data replaced with a empty-field flag 770, and (3) for participant C, a video stream 775 that has participant A's encoded video data replaced with a empty-field flag 780. As mentioned above, some embodiments do not employ such empty-field flags, and instead rely on the non-focus module decoders to automatically identify the empty sub-frames.

Once the redundancy remover removes each participant's redundant image data from the participant's video stream, the redundancy remover transmits the participant's video stream to the participant. Accordingly, FIG. 6 illustrates the redundancy remover 665 sending three video streams to the three non-focus participants A, B. and C.

FIG. 6 also illustrates that the perspective adjuster 675 of the focus-point module 510 retrieves the focus point participant's image from focus point sub image 656 in the composite image buffer 655. The perspective adjuster 675 also retrieves non-focus participants sub images from the intermediate buffers 635, 640, and 645. The adjuster 675 adjusts each non-focus participant's sub-frame in the composite image for the perspective view illustrated in FIG. 4. It then supplies the adjusted composite frame to the local image controller, which then renders the final composite image for display on the display device 695 of the focus-point computer.

Figure 8:
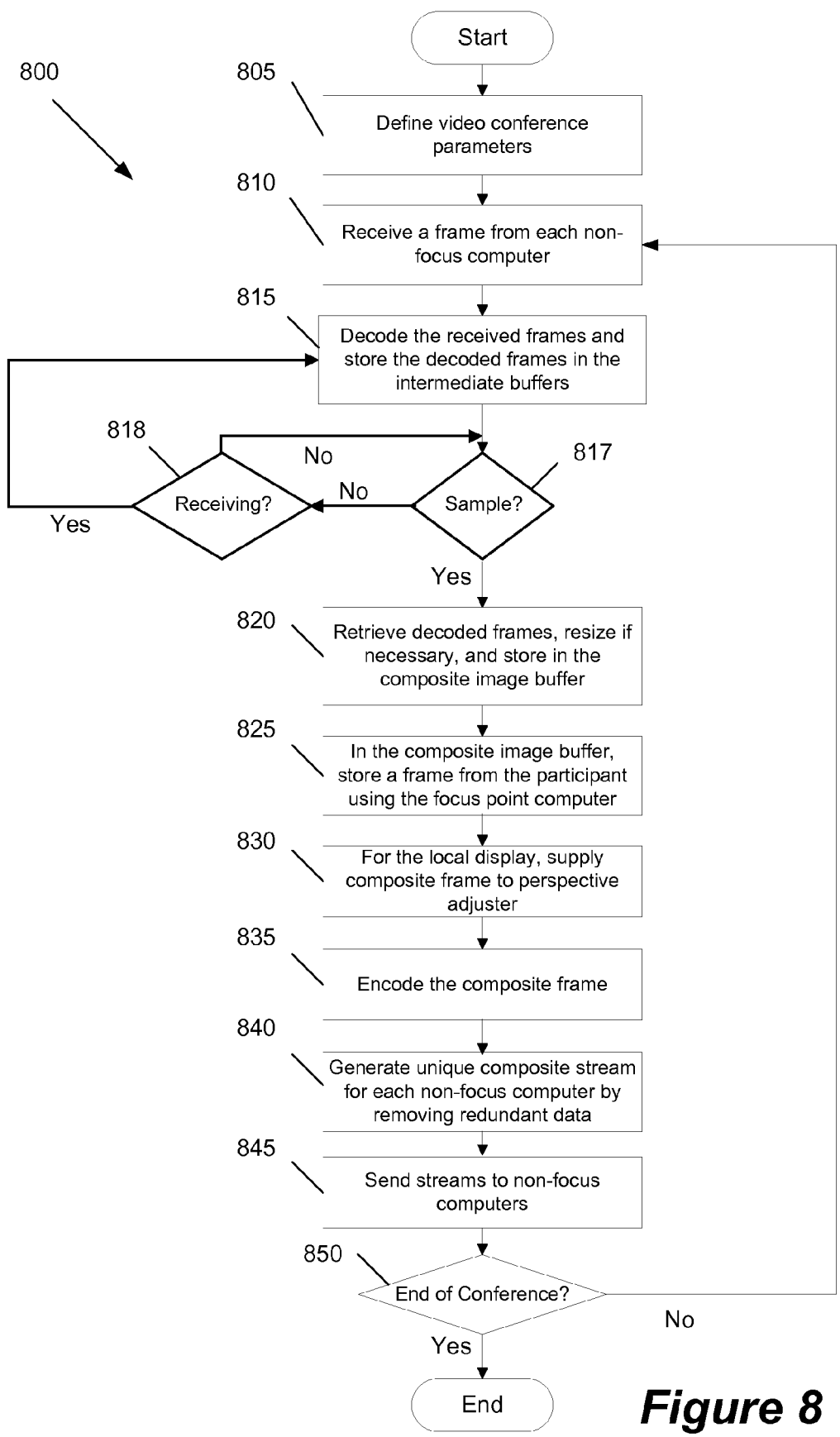
FIG. 8 is a flow chart showing focus point video processing of some of the embodiments.

During a video conference, each of the components of the focus-point module 510 iteratively performs the above-described operations. FIG. 8 presents a process 800 that conceptually shows these iterative operations of the focus-point module 510 in some embodiments. In some embodiments, the focus-point module 510 performs this process 800 for a video conference with n participants, where n can be any number more than two.

As shown in FIG. 8, the focus-point process 800 initially defines (at 805) one or more parameters relating to the video conference. Different embodiments define different parameters at 805. Examples of such parameters include the type of encoding used by the encoder of each non-focus computer, the size of frames transmitted by each non-focus computer, the type of encoding used by the focus-point computer, the size of the composite image buffer, etc. The above-incorporated U.S. patent application entitled "Multi-Participant Conference Setup", describes how these parameters are set and possibly reset during a video conference.

Next, the focus-point module receives (at 810) a frame from each non-focus computer. A decoder (e.g., a decoder 620, 625, or 630) of the focus-point module 510 then decodes (at 815) the received frame and stores the received frame in an intermediate image buffer (e.g., a buffer 635, 640, or 645). To decode frames from a particular non-focus computer, a decoder uses decoding algorithms that are appropriate for the encoding that the particular non-focus computer uses. These encoding and/or decoding algorithms are specified during the initialization operation 805 of the process 800. In some embodiments, these algorithms might be re-specified during a video conference as the conditions of the video conference change (e.g., as new participants join or leave the video conference), as mentioned in the above-incorporated application.

After 815, the focus-point module 510 determines (at 817) whether it is time for the resizers to sample the intermediate buffers (i.e., to retrieve decoded frames from the intermediate buffers, e.g., buffers 635-645 in case of three non-focus participants). As mentioned above, the sampling rate is set by the frame rate controller 652.

When the process 800 determines (at 817) that it is not time for the resizers to sample the intermediate buffers, the process transitions to 818. At 818, the process determines whether any new frame has been received from a non-focus participant. If so, the process transitions to 815 to decode the received frame and store the decoded frame in the appropriate intermediate image buffer. On the other hand, when the process determines (at 818) that it is not receiving any frame, it transitions back to 817, to determine whether it is time for the resizers to sample the intermediate buffers.

When the process determines (at 817) that it is time for the resizers to sample the intermediate buffers, the resizers (e.g., resizers 647-649) retrieve (at 820) decoded frames from the intermediate buffers (e.g., buffers 635-645), resize these retrieved frames if necessary, and store these frames in the composite image buffer 655.

Next, at 825, the local image capture 651 stores in composite-buffer section 656 a frame that the camera 650 captures of the participant that is using the focus-point computer. At 830, the focus point sub image 656 from the composite image buffer and non-focus participants' sub images from the intermediate buffers 635, 640, and 645 are supplied to the perspective adjuster 675, which then adjusts each non-focus participant's sub-frame in the composite image for the perspective view illustrated in FIG. 4. The adjuster 675 supplies the adjusted composite frame to the local image controller, which then renders the final composite image for display on the display device 695 of the focus-point computer.

The composite frame is also supplied (at 835) to the encoder 660, which encodes each sub-frame in the composite image independently of the other sub-frames. The redundancy remover 665 then generates (at 840) a video stream for each non-focus participant by removing the non-focus participant's video content from the encoded video stream produced by the encoder. The redundancy remover transmits (at 845) each participant's video stream to the participant. After 845, the focus-point process 800 determines (at 850) whether the multi-participant video conference has terminated. If so, the process 800 terminates. Otherwise, the process transitions back to 810 to receive another frame.

As mentioned above, FIG. 8 is a conceptual illustration of the focus point's decoding and encoding operations in some embodiments. In some embodiments, the focus point module performs one or more decoding and encoding operations concurrently and independently in a multi-threaded processing scheme.

Figure 9:
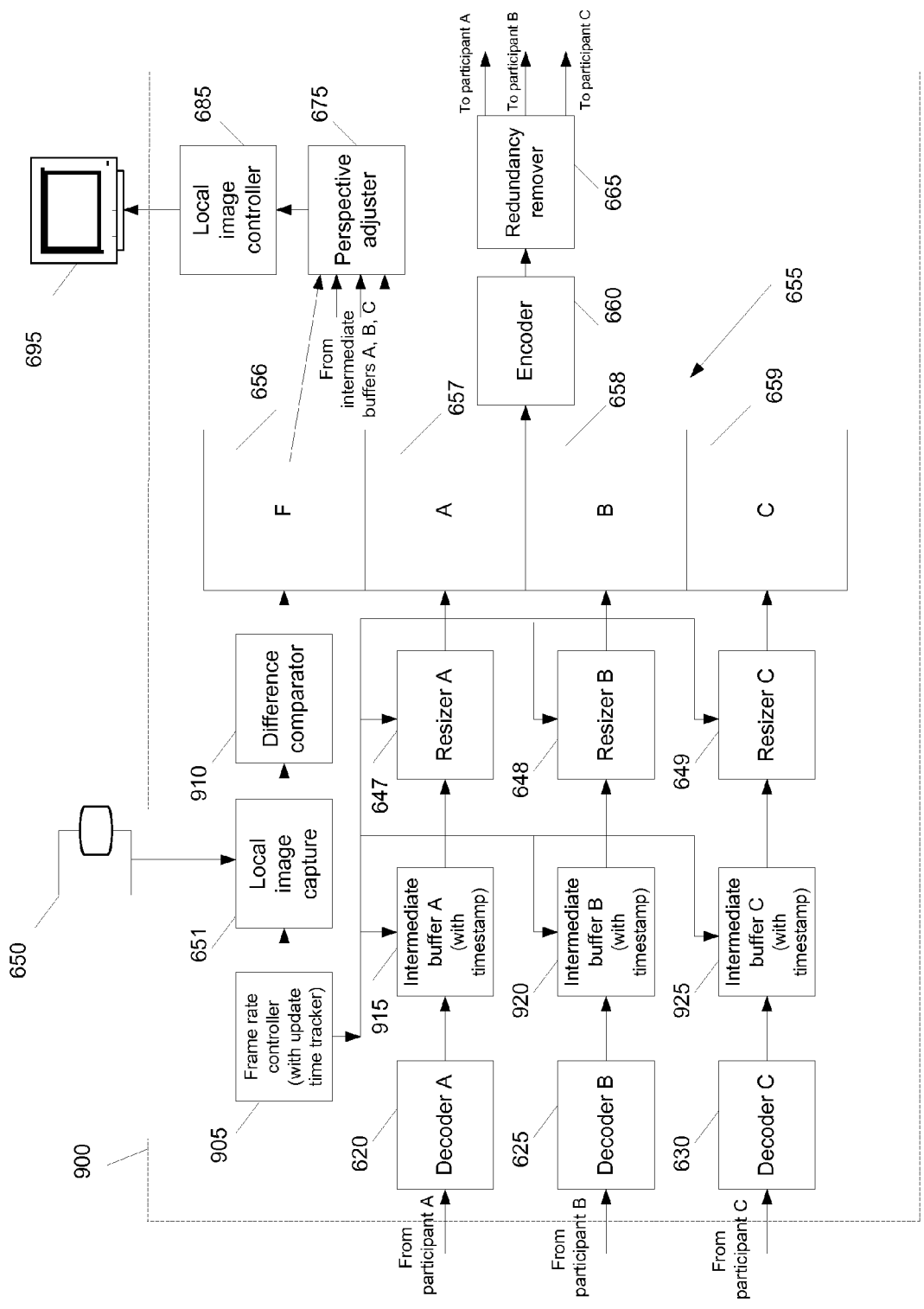
FIG. 9 illustrates the focus-point module with difference comparator in some embodiments of the invention.

Also, in some embodiments, the focus point module includes other software modules. For instance, FIG. 9 illustrates an alternative implementation of the focus point module. This implementation is similar to the implementation illustrated in FIG. 6, except that the focus point module 900 (1) has a frame rate controller with update time tracker 905, (2) a difference comparator 910, and (3) intermediate buffers 915-925 with timestamp fields.

The additional features of the frame rate controller and the intermediate buffer allow the focus-point module to avoid encoding the same frame from a non-focus point computer more than once. Specifically, when one of the decoders 620-630 writes a new frame into one of the intermediate buffers 915-925, the decoder records the time in the timestamp field of the intermediate buffer.

At a particular frame rate, the frame rate controller 905 checks the timestamp field of each intermediate buffer. If the frame rate controller detects that an intermediate buffer's timestamp is later than the previous time that this buffer's content was supplied to its corresponding resizer, the frame rate controller directs the buffer's corresponding resizer to retrieve the buffer's content. Alternatively, when the frame rate controller detects no difference between the buffer's timestamp and the last time that the buffer was read by its corresponding resizer, the frame controller forgoes calling the resizer to read the content of the buffer. This is because in this case the intermediate buffer has not received any new frames since the last time that it was read by its corresponding resizer. Foregoing read out of the same frame multiple times eliminates unnecessary encoding of duplicate frames, and thereby save computational and bandwidth resources of the computers involved in the video conference.

Figure 10:
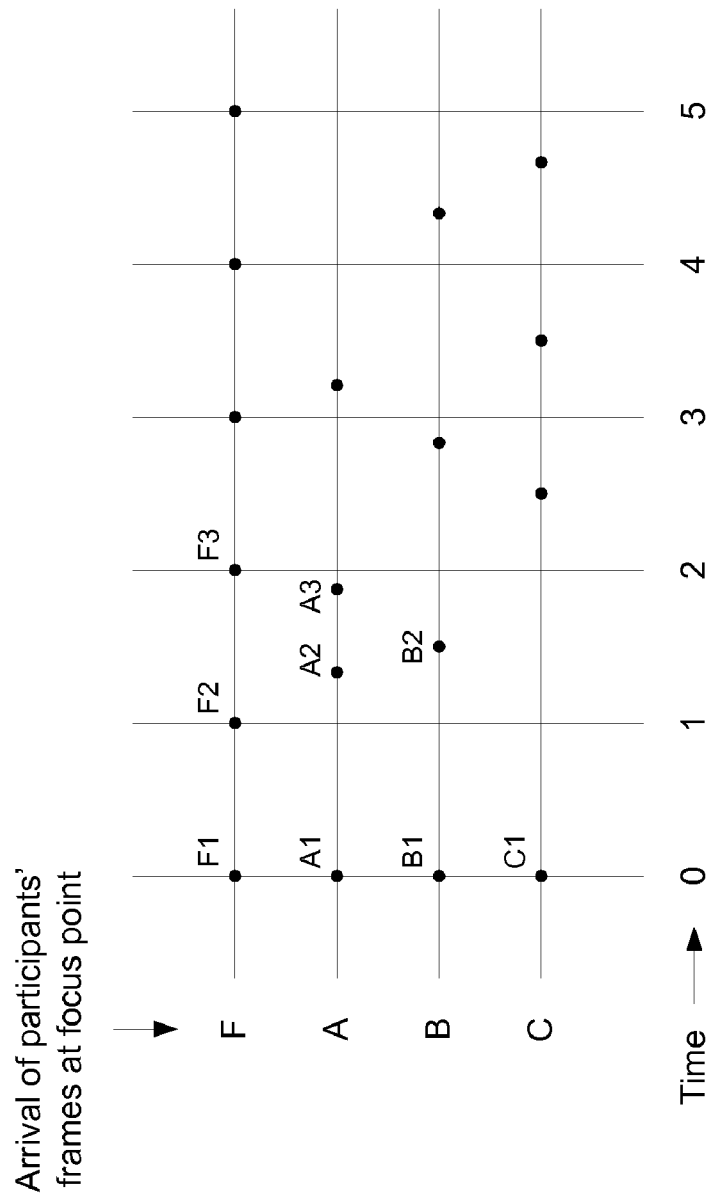
FIG. 10 is an example of new frames arriving at different times at the focus point encoder.

To illustrate this benefit, FIG. 10 presents an example where delays in signal transmission between the focus and non-focus computers cause the focus point computer to skip the encoding of certain duplicate frames. Specifically, this figure illustrates the storage of frames in intermediate buffers 915-925 of the focus point module. In this figure, passage of time is shown from left to right, while the storage of each participant's frame in a focus-point intermediate buffer is shown by dots placed on the horizontal lines.

For example, at time 0, the focus-point intermediate buffers have new frames from the focus point and all non-focus participants. These frames are labeled as F1, A1, B1, and C1 in FIG. 10. Each of these frames is encoded and transmitted to the non-focus participants. By time 1, the only new frame that is stored is the focus participant's image, which is identified as frame F2 in FIG. 10. The focus-point module, therefore, skips the retrieval and the encoding of the non-focus point participants' frames since they have not changed since time 0.

Between times 1 and 2, the focus-point computer receives one new frame from the focus point camera, two new frames from the participant A, and one new frame from the participant B. The newly arrived frames are identified as frames F3, A2, A3, and B2 respectively in FIG. 10. Hence, by time 2, the focus-point module stores frames F3, A3, and B2 as subframes in the composite image buffer, and then encodes and transmits composite images based on these stored subframes. In this case, frame A2 is lost to the other participants in the conference as it was overwritten in the intermediate buffer before it could be retrieved by the focus-point module. Also, at time 2, the resizer 649 (for participant C's data) does not retrieve the content of the intermediate buffer 925 since the content of this buffer at time 2 has not change from time 0, which was the last time that this intermediate buffer 925 was read by the resizer 649.

Due to a variety of reasons, the camera 650 at the focus-point computer might produce identical frames during two or more successive instances when the local image capture module 651 receives frames from it. Accordingly, to avoid duplicate processing of images of the local focus-point participant D, the focus-point module 900 utilizes the difference comparator 910. Specifically, at a particular frame rate, the frame rate controller 905 directs the local image capture 651 to capture a frame from the local camera 650. The local image capture module 651 of FIG. 9 supplies the captured frame to difference comparator 910, unlike the capture module 651 of FIG. 6, which would directly store this frame in the section 656 of the composite image buffer 655. The difference comparator 910 then stores the received frame in section 656 of the composite image buffer so long as it determines that the last frame it stored in this section was not identical or very similar to the received frame. In some embodiments, the difference comparator 910 computes a metric that expresses the difference between the received frame and the last frame that the comparator stored in the composite image buffer. If this metric is lower than a particular threshold, the comparator 910 will detect that the received frame is identical or very similar to the last frame that it stored in the composite image buffer.

If the comparator determines that the received frame is identical or very similar to the last frame it stored in the composite image buffer, it discards the received frame, in order to conserve the computational and bandwidth resources of the computers involved in the video conference. Otherwise, the comparator stores the received frame in section 656 of the composite image buffer and maintains a copy of this frame for its difference comparison the next time that it receives a frame from the local image capture.

As mentioned above, the update tracking of the frame rate controller and the difference comparison of the comparator 910 may cause one or more sections of the composite image buffer 655 to be empty at a particular time that the focus-point module 900 is generating and encoding composite frames. Accordingly, the composite frames that are generated at such instances by the focus-point module will have one or more empty sub-frames. Such empty sub-frames may be identified by flags, or may be automatically identified by the decoders of the non-focus computers, as mentioned above.

Avoiding processing and encoding of duplicate frames is useful in many contexts other than a multi-participant video conference. For instance, in peer-to-peer video conferences, it is useful for avoiding duplicate decoding of a frame from the other participant, or duplicate encoding of a frame that is locally captured.

Figure 11:
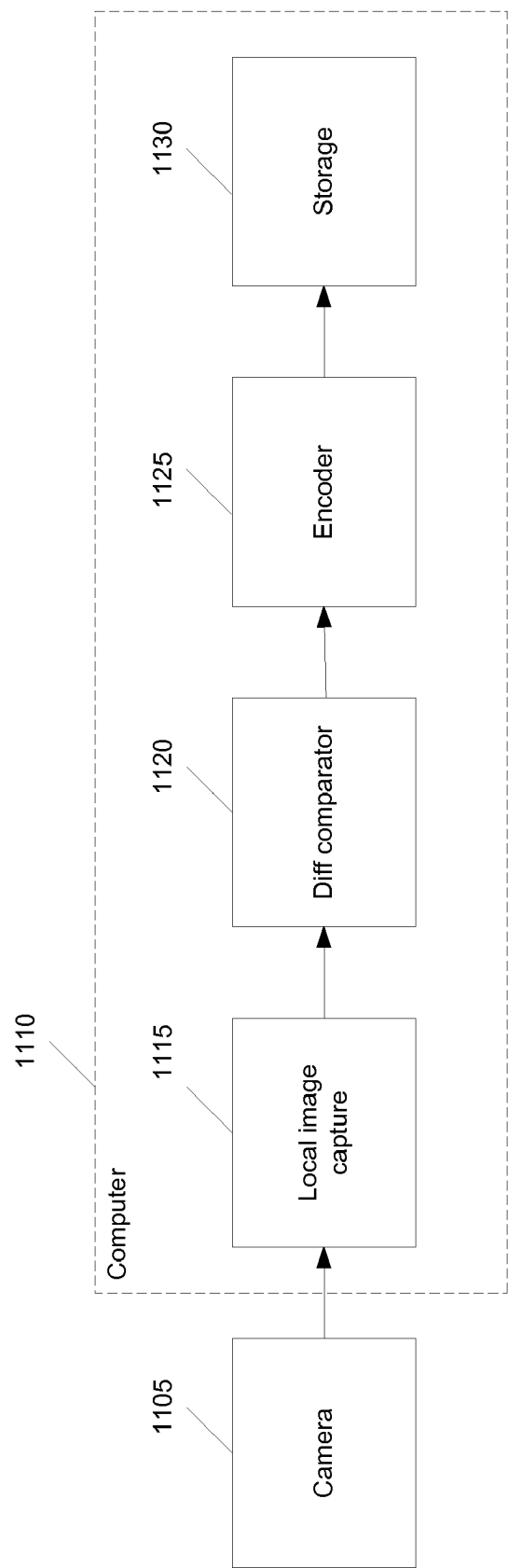
FIG. 11 illustrates the application of avoiding redundant frames in a non-video conference application.

Avoiding duplicate processing and encoding is also useful in on-video conference settings. FIG. 11 illustrates one such setting. Specifically, this figure illustrates a case where a computer 1100 captures frames from a camera, encodes these frames, and then locally stores these frames. As shown in this figure, the computer 1100 has a local capture module that captures frames from a video camera 1105 at a particular rate. Due to a variety of reasons, the camera 1105 might produce identical frames during two or more successive instances when the local image capture module 1115 receives frames from it.

The local image capture module 1115 supplies each captured frame to the difference comparator 1120, which then may or may not forward the captured frame to the encoder 1125. In particular, the comparator 1120 compares the frame that it receives from the capture module 1115 with the last frame that the comparator supplied to the encoder 1125. If the two frames are identical or very similar, the difference comparator foregoes supplying the received frame to the encoder. Alternatively, when the two frames are not identical or very similar, the difference comparator forwards the received frame to the encoder for encoding. The encoder encodes any frames that it receives and then stores them on the storage, which could be computer memory, hard disk, DVD, or similar media.

III. Non-Focus Point Module

Figure 12:
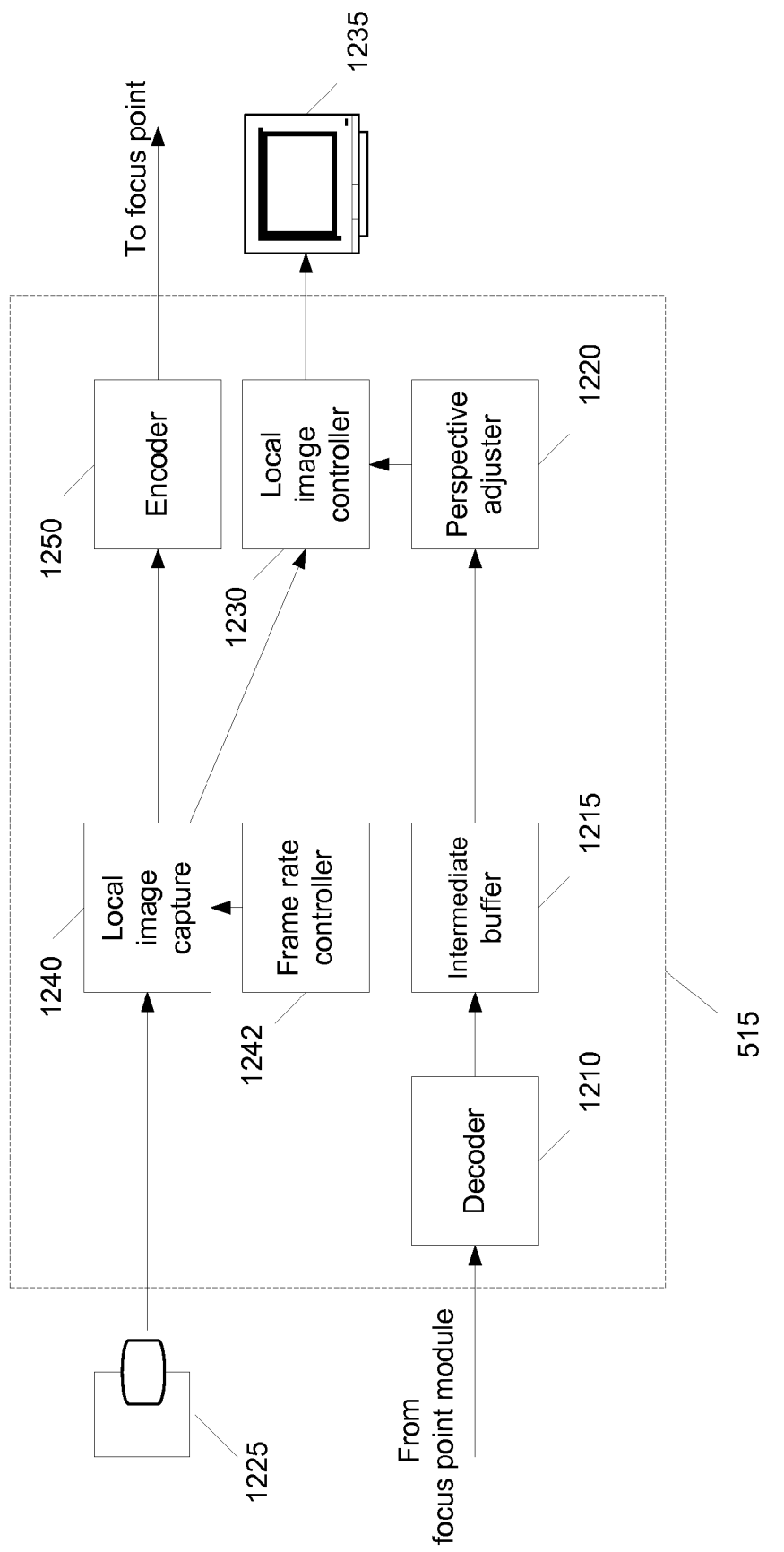
FIG. 12 illustrates the non-focus point module of some embodiments.

FIG. 12 illustrates the non-focus point module 515 of some embodiments of the invention. The non-focus point module performs encoding and decoding operations. For its encoding operation, the non-focus point module 515 utilizes a local image capture module 1240, a frame rate controller 1242, and an encoder 1250. For its decoding operation, the non-focus point module 515 utilizes a decoder 1210, an intermediate buffer 1215, a perspective adjuster 1220, and a local image controller 1230.

During the video conference, a camera 1225 attached to the non-focus computer films the video-conference participant who is using the non-focus point computer. During the encoding operation, the local image capture module 1240 receives and captures video frames that are produced by the camera. At a particular sampling rate that is specified by the frame rate controller 1242, the local image capture module 1240 directs the captured frames to the encoder 1250, which then encodes and transmits the frames to focus-point computer. In some embodiments, the frame rate controller 1242 changes the particular frame rate during a video conference as the conditions of the video conference change.

During its decoding operation, the non-focus module 515 receives composite frames from the focus point module 510 and decodes them for display on the display device 1235 of the non-focus computer. This decoding operation is further described by reference to FIG. 13, which conceptually illustrates a decoding process 1300 of the non-focus point module.

Figure 13:
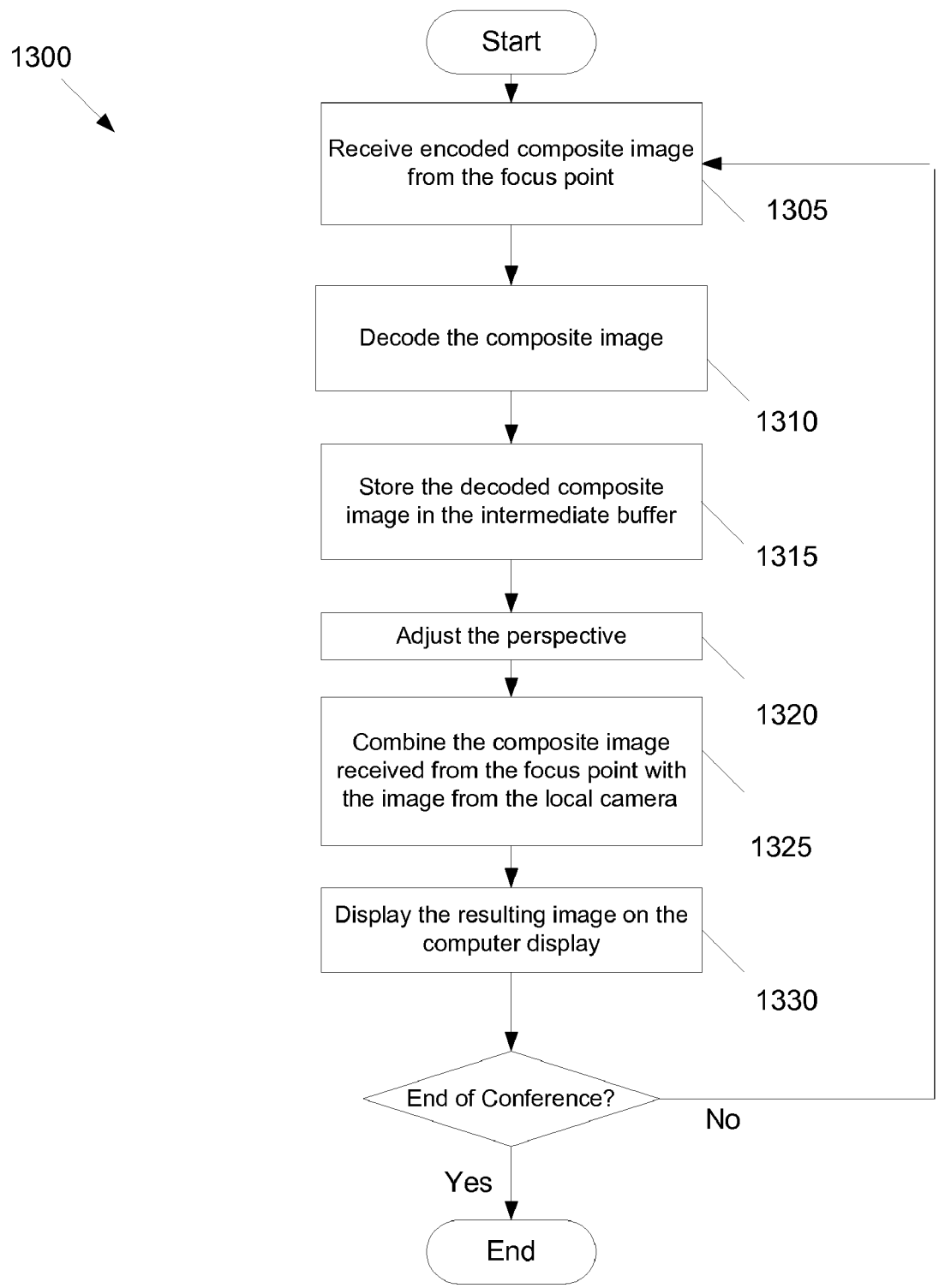
FIG. 13 illustrates the decoding operation of a non-focus point module of some embodiments.

As shown in FIG. 13, the decoding process 1300 of the non-focus point module starts when the non-focus point module receives (at 1305) a video stream that contains a composite frame from the focus point module. Next, the decoder 1210 of the non-focus module 515 decodes (at 1310) the received composite frame.

In some embodiments, the decoder 1210 decodes the composite frame without first extracting the sub-frame that make up the composite frame. In some embodiments, the decoder uses any empty-field flag to identify any sub-frame that is left empty. In other embodiments, the decoder does not need to rely on the empty-field flag, because it can identify the sub-frames through some other approach (e.g., it can identify the sub-frame associated with each macroblock in the composite frame).

Each decoded sub-frame represents a frame of one of the other participants in the video conference. After decoding a composite frame, the decoder stores (at 1315) the sub-frames in the decoded composite frame in an intermediate buffer 1215. In some embodiments, the intermediate buffer 1215 is formed by three smaller intermediate buffers, one for storing each potential sub-frame of the decoded composite frame. At 1320, the perspective adjuster then retrieves the decoded sub-frame from the intermediate buffer, and adjusts the perspective view of these images of the other conference participant. As mentioned above, FIG. 4 illustrates one example of such perspective views. The adjuster 1220 supplies the adjusted composite frame to the local image controller 1230. The local image controller also receives a video frame of the local non-focus point video-conference participant from the local image capture 1240. From the adjusted frames of the other conference participants and the local participant's captured frame, the local image controller 1230 then renders (at 1325) the video-conference display presentation for display on the display device 1235 of the non-focus computer.

After 1330, the non-focus decoding process 1300 determines (at 1335) whether the multi-participant video conference has terminated. If so, the process 1300 terminates. Otherwise, the process returns to 1305 to receive another encoded composite image.

Figure 14:
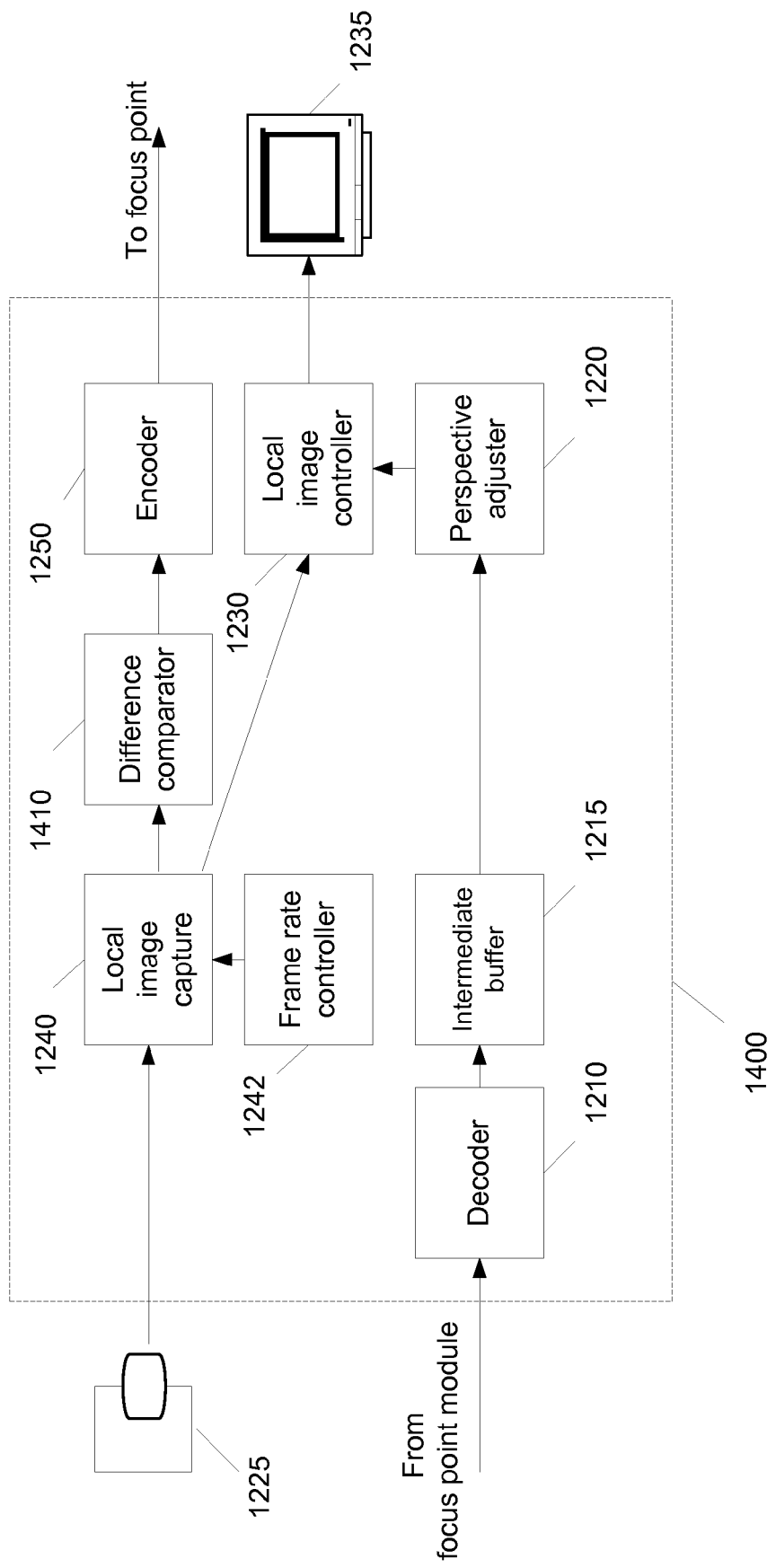
FIG. 14 illustrates the non-focus point module with difference comparator in some embodiments.

As mentioned above, FIG. 13 is a simplified conceptual illustration of the non-focus point module's decoding and encoding operations. In some embodiments, the non-focus point module includes other software modules. For instance, FIG. 14 illustrates an alternative implementation of the non-focus point module. This implementation is identical to the implementation illustrated in FIG. 12, except that the non-focus point module 1400 has a difference comparator 1410.

This difference comparator serves the same role as the difference comparator 910 in FIG. 9. Specifically, it prevents duplicate encoding of identical or very similar locally captured frames. When the local image capture module 1240 captures a frame, it supplies the captured frame to the difference comparator 1410 instead of sending it directly to encoder 1250.

The difference comparator 1410 then supplies the captured frame to the encoder 1250 so long as it determines that the last frame that it supplied to the encoder was not identical or very similar to the captured frame. In some embodiments, the difference comparator 1410 computes a metric that expresses the difference between the received frame and the last frame that the comparator supplied to the encoder 1250. If this metric is lower than a particular threshold, the comparator 1410 will detect that the received frame is identical or very similar to the last frame that it supplied to the encoder.

If the comparator determines that the received frame is identical or very similar to the last frame supplied to the encoder, it discards the received frame, in order to conserve the computational and bandwidth resources of the computers involved in the video conference. Otherwise, the comparator supplies the received frame to the encoder 1250 and maintains a copy of this frame for its difference comparison the next time that it receives a frame from the local image capture.

In some embodiments, the non-focus point module also includes a frame rate controller with update time tracker and an intermediate buffer with timestamp. Similar to the discussion for the focus point module in the previous section, in these embodiments the non-focus point module can save computing resources by avoiding sending duplicate decoded images from the intermediate buffer 1215 to perspective adjuster 1220.

One of ordinary skill in the art will realize that the above-described video encoding, decoding, and distribution techniques have numerous advantages. For instance, the video compositing approach of the focus-point module 510 simplifies the removal of redundant video data, which, in turn, conserves much needed network bandwidth during the video conference.

Figure 15:
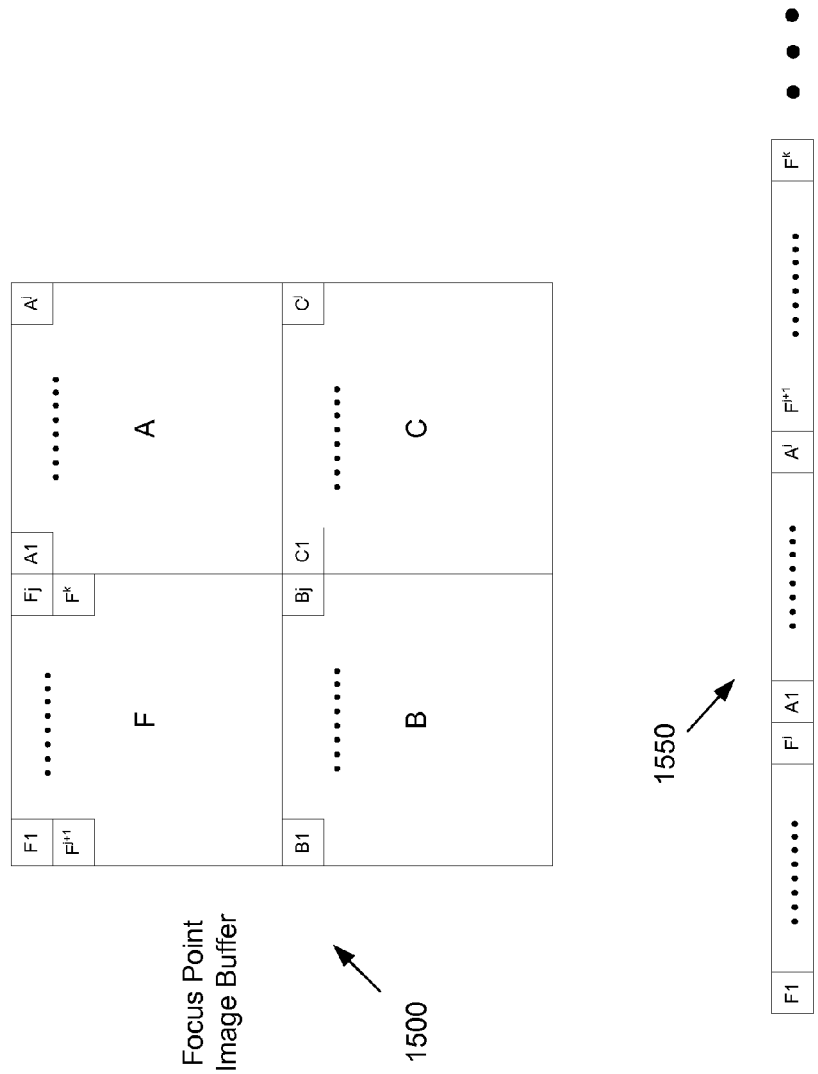
FIG. 15 shows the focus point's 2×2 positioning of participants' sub frames in some embodiments.

To illustrate these benefits, FIG. 15 illustrates another approach for compositing the video data in a 4-way video conference. In this approach, the focus-point module composites the frames of the participants in a 2×2 format 1500. The focus point 510 then encodes and sends the resulting encoded image to each participant. FIG. 15 illustrates that the encoding of the composite 2×2 frame 1500 results in the video stream 1550, which has the video data from the different participants interleaved. Specifically, the initial portion of the video stream 1550, which is illustrated in FIG. 15, shows the video data from the focus-point participant F and the non-focus point participant A interleaved.

Figure 16:
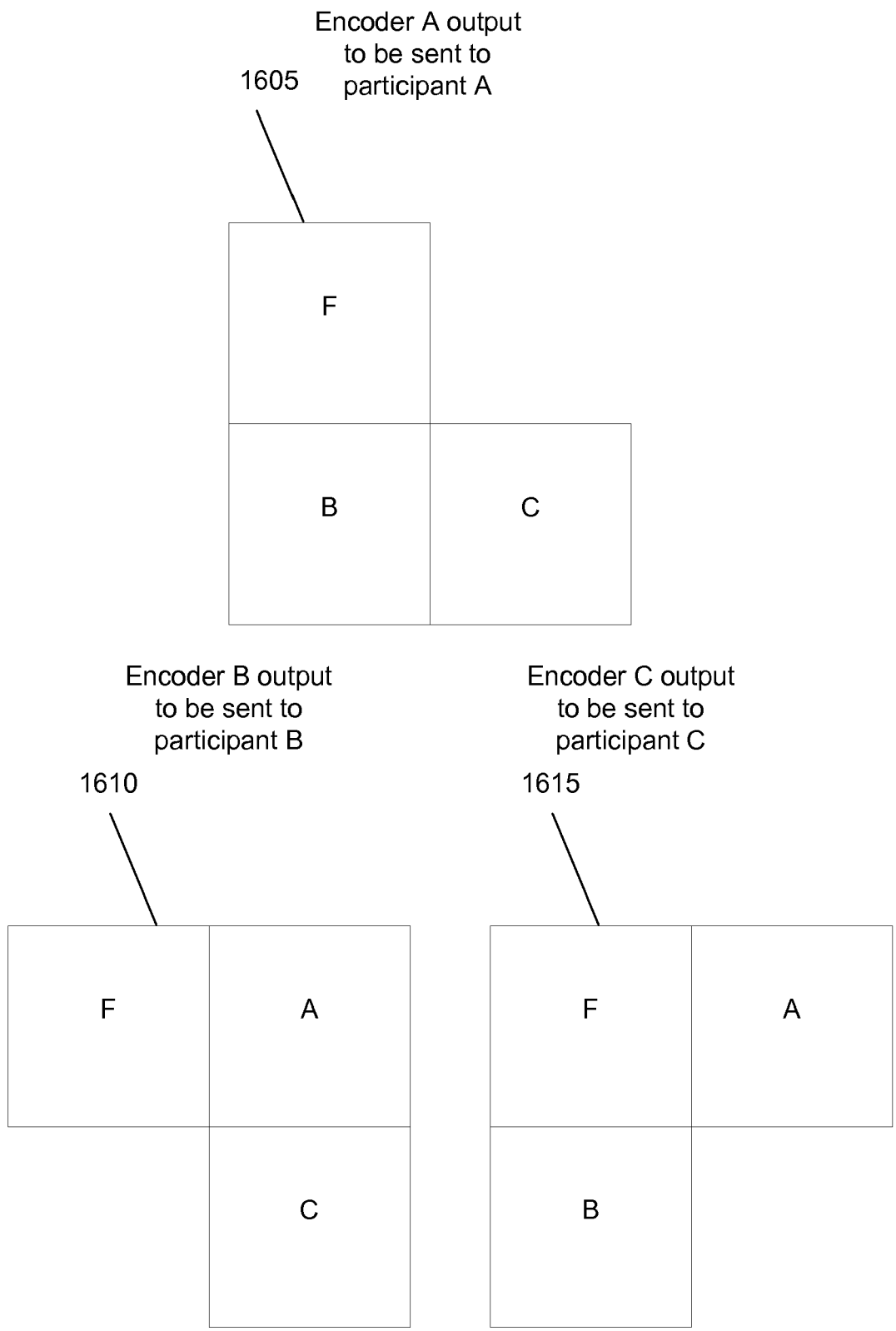
FIG. 16 illustrates how in some embodiments the focus point uses several encoders to eliminate each participant's own image from the composite image the participant receives.

This interleaving makes it difficult to remove each participant's own video data from the video stream that the focus-point module supplies to the participant. To simplify this removal, one solution would be (1) to generate three different composite video frames for three different non-focus participants, as illustrated in FIG. 16, and then (2) to use three different encoders to encode the three different composite video frames. This approach does eliminate each participant's video data from the composite video stream that the participant receives, but it requires more processing resources to support the extra encoders.

IV. Constraining Encoding

A. Overview

As described in Section II above, the focus point module generates a composite frame that has two or more sub-frames, where each sub-frame is a frame from one of the participants in the video conference. In some embodiments, the focus point module arranges each participant's frame in the composite frame in a non-interleaved manner. In these embodiments, the encoding process utilizes a set of constraints to prevent the encoding of each of the sub-frames from relying on any part of another sub-frame.

Figure 17:
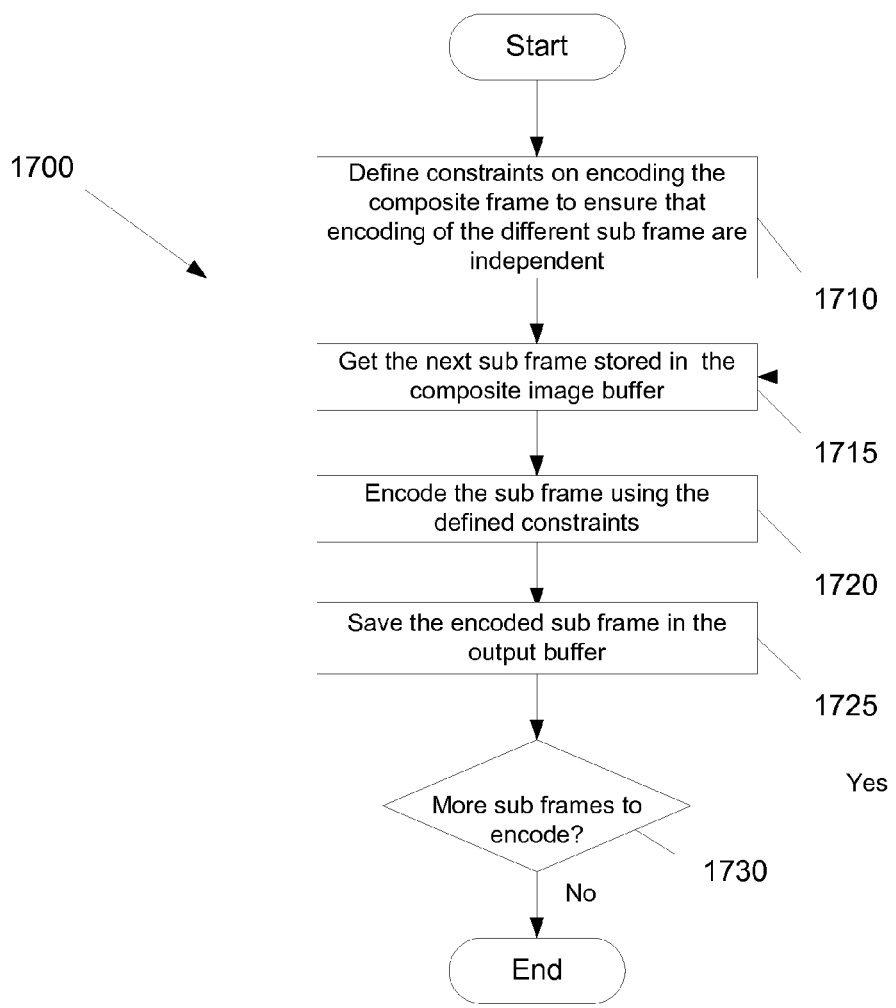
FIG. 17 illustrates steps the encoder takes to encode a composite video image in some embodiments

FIG. 17 illustrates an encoding process 1700 of the encoder 660 of the focus point module of some embodiments. Before encoding a composite frame, the encoding process 1700 defines (at 1710) a set of constraints on encoding the composite frame to ensure that the encoding of different sub-frames of the composite frame remain independent of each other. Several examples of these constraints are further discussed below in Section IV.B. In some embodiments, the encoding process 1700 does not define (at 1710) the set of constraints each time it executes for a composite frame. Rather, it performs the constraint-defining operation once each time a participant joins or leaves the conference.

After 1710, the process 1700 then iteratively encodes the composite frame by performing the following operations. At 1715, the process 1700 retrieves an unencoded sub-frame from the composite image buffer 655. Using the encoding constraints, the encoding process 1700 encodes (at 1720) this retrieved sub-frame. The encoded sub-frame is then saved (at 1725) in the output buffer. After 1725, the process 1700 determines (at 1730) whether there is another sub-frame to encode. If so, the process transitions back to 1715 to get the next sub-frame from the composite image buffer 655. Otherwise, the process terminates.

B. Constraints

As mentioned above, encoding process 1700 defines (at 1710) a number of constraints and then encodes (at 1720) the sub-frames in the composite frame based on these constraints. These constraints are interblock encoding constraints, intrablock encoding constraints, and loop filtering constraints. Several examples of these constraints are described below.

1. Interblock Encoding Constraints

Two examples of interblock encoding are described below. These examples are (1) constraints on the size of search window during encoding, and (2) constraints on the target sub-pixels used to search or encode a pixel block. Interblock encoding encodes one block of pixels in a current frame by reference to one or more portions of one or more reference frames. Interblock encoding involves one or more motion estimation operations, where each motion estimation operation identifies a portion of a reference frame that best matches a block of pixels in the current frame. Such an identification yields a motion vector that can serve as the encoded representation of the current-frame pixel block. During decoding of the current-frame pixel block, this motion vector is used to identify a portion of the reference frame block that provides the pixel values of the current-frame pixel block.

The encoder's motion estimation operation defines at least one search window in the reference frame. It then searches within this window for a portion of the reference frame that best match the current-frame pixel block. This portion might be aligned with pixel locations in the reference frame, or sub-pixel locations in the reference frame. Sub-pixel locations are non-integer locations in the reference frame, while pixel locations are integer locations in the reference frame with pixels defined at integer locations in the reference frame.

In some embodiments, the encoder might use a multi-stage motion estimation process that performs coarse and refined searches and uses different search windows for at least some of the searches.

a) Constraints on Search Window

Figure 18:
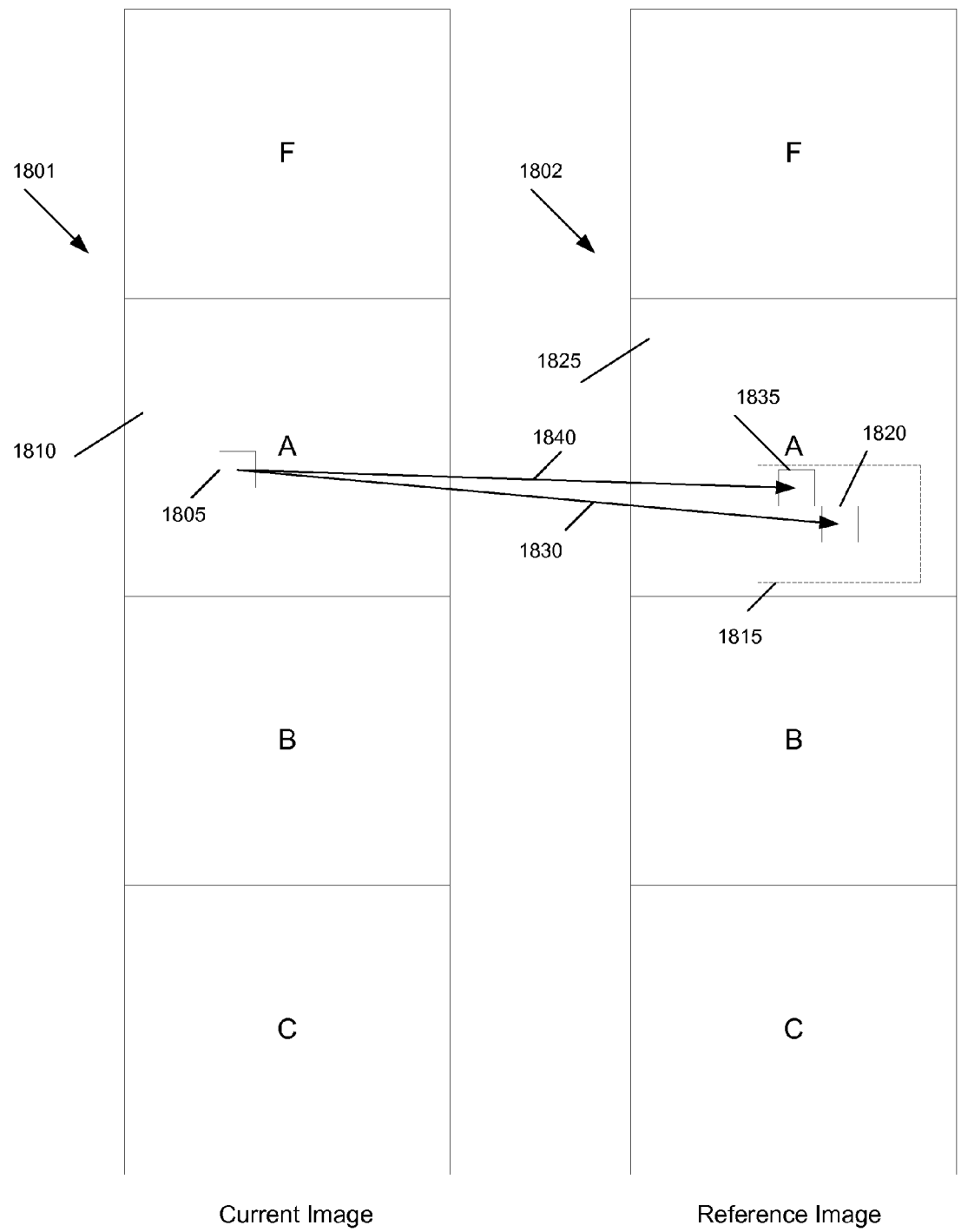
FIG. 18 is an example of a permissible search window for a motion vector.

In order to make each participant's sub-frame independent, the search widow for each pixel block must be confined within the same sub-frame as the one that the particular pixel block is located in. For example, FIG. 18 illustrates a search window 1815 that is allowed by the current invention. In this example, the current composite frame 1801 is being encoded by using a reference composite frame 1802. The pixel block 1805 that is being encoded is located within Participant A's sub-frame 1810. To encode this pixel block, the encoder searches within the search window 1815, which is centered in some embodiments around a position that is identified by an initial motion vector 1830. The initial motion vector in some embodiments is set to a default value or is derived from the motion vector of the neighboring pixel blocks that have already been interblock encoded. The motion estimation operation searches the window 1815 to identify a pixel block 1835 of the reference sub-frame 1825 in the search window 1815 that best matches the current-frame pixel block 1805. As shown in FIG. 18, this pixel block in the reference sub-frame 1825 is identified by a final motion vector 1840 that is specified by the motion estimation operation.

Any pixel block inside the search window 1815 is also located within Participant A's sub-frame 1825 in the reference composite frame 1802. Any decoder that receives participant A's sub-frame 1810 in the current frame 1801, would have Participant A's sub-frame in the reference frame 1802. Therefore, the decoder would be able to reconstruct pixel block 1805 using the final motion vector 1840 specified by the motion estimation operation.

Figure 19:
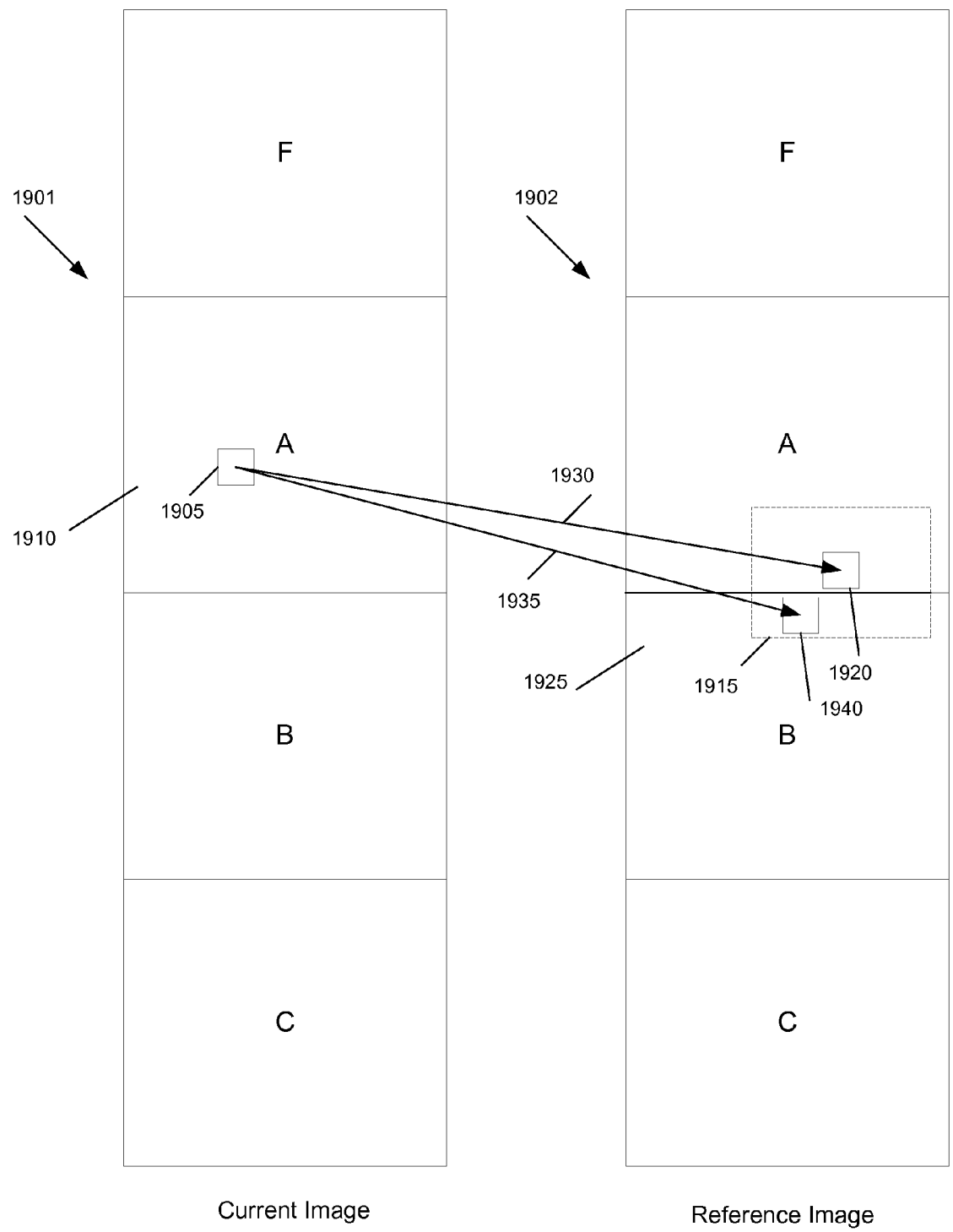
FIG. 19 illustrates an example of an impermissible motion vector search window in some embodiments of the invention.

In contrast, FIG. 19 illustrates an example of a search window that is not allowed by the current invention. In this example, the current composite frame 1901 is being encoded by, using a reference composite frame 1902. The encoder is encoding pixel block 1905 that is located within Participant A's sub-frame 1910.

FIG. 19 illustrates a search window 1915 for a motion estimation operation. A part of the search window is in Participant B's sub-frame 1925. Hence, if this search window 1915 were to be used, it might eventually result in a matching pixel block in that sub-frame. Since the sub-frames should be kept totally independent, any search windows that may result in inter-dependencies among sub-frames is not allowed.

The reason for disallowing search window 1915 would become obvious by considering that the focus point module 510 eliminates Participant B's sub-frame 1925 from the compressed composite frame it sends to Participant B, as discussed in Section II above. Since participant B's decoder 1210 has never received reference sub-frame 1925, it would not be able to reconstruct pixel block 1905 when the final motion vector (such as motion vector 1935) identified by the motion estimation operation points to a pixel block (such as pixel block 1940) inside of sub-frame 1925.

The search window might overlap two sub-frames in the reference composite frame when the initial motion vector is close to the boundary of the two sub-frames or falls within the other sub-frame. In both these situations, some embodiments address the search window issue by moving the search window up or cropping the portion of the search window that falls in the other sub-frame.

Figure 20:
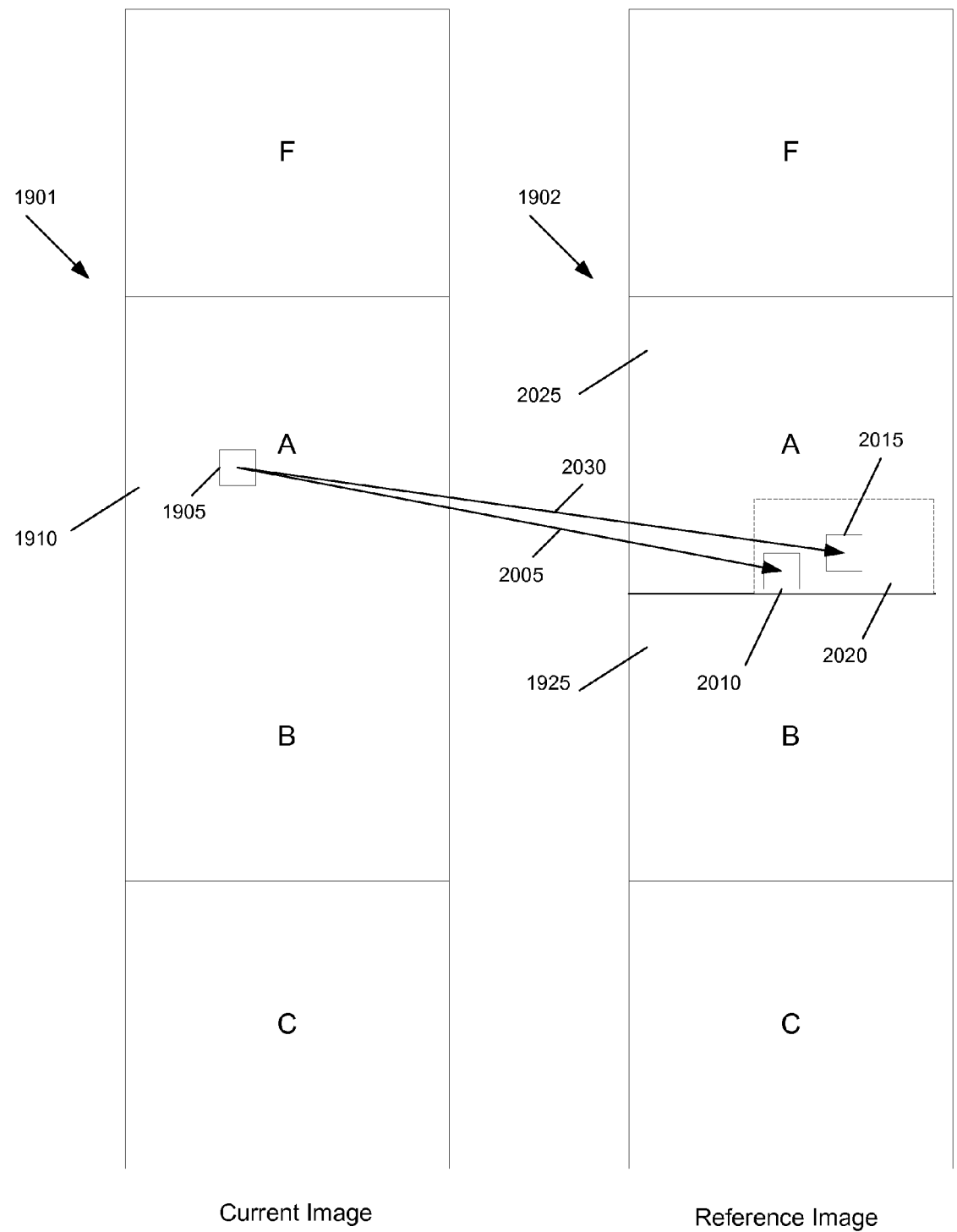
FIG. 20 is an example of a search window for a motion vector that is cropped to fit in the current sub-frame.

FIG. 20 illustrates an example of cropping the search window 1915 of FIG. 19, which results in a cropped search window 2020. The cropped search window 2020 is only in sub-frame 2025. Any decoder that receives Participant A's sub-frames would have Participant A's sub-frame in the reference frame 1902. Therefore, the decoder would be able to reconstruct pixel block 1905 by using the final motion vector 2005 (specified by the motion estimation operation), which identifies the pixel block 2010. Given that the search window 2020 does not fall outside of the sub-frame 2025, the final motion vector 2005 and its corresponding pixel block are guaranteed to be in the sub-frame 2025.

Figure 21:
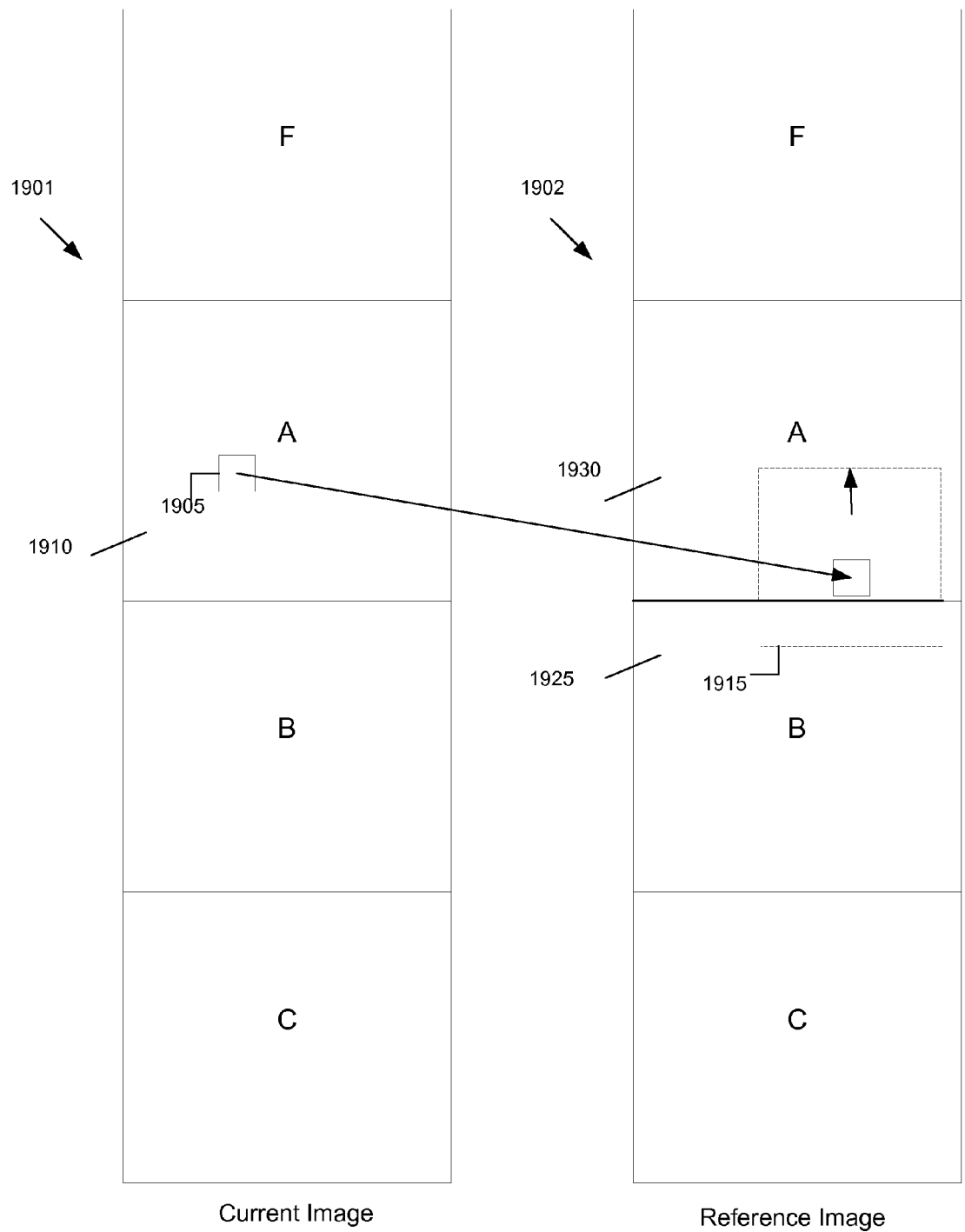
FIG. 21 is an example of a search window for a motion vector that is moved in order to fit in the current sub-frame.

Instead of cropping the search window 1915, the encoder in some embodiment moves this search window in a direction away from the other sub-frame so that the entire search window would be within the desired sub-frame. FIG. 21 illustrates an example of such a movement for the example illustrated in FIG. 19.

Figure 22:
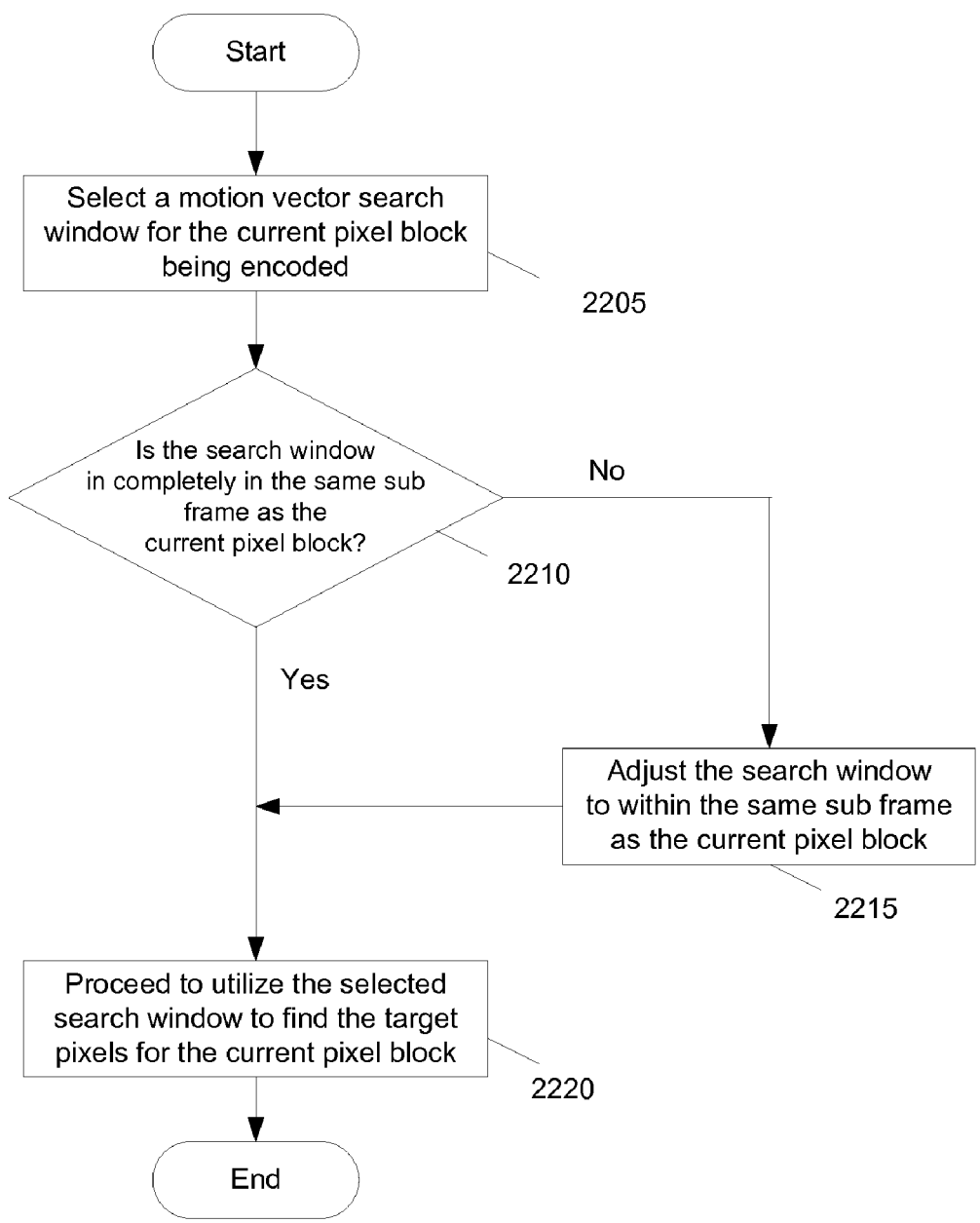
FIG. 22 is a flowchart illustrating how a motion vector search window is adjusted to fit in the current sub-frame in some embodiments.

FIG. 22 illustrates how the encoder 660 constrains the search windows to remain within a desired sub-frame. At 2205, the encoder 660 uses a predefined method to select a motion vector search window for the current pixel block being encoded. Before utilizing this search window in the encoding operation, however, the encoder 660 checks (at 2210) whether the search window is completely within the same sub-frame (called the target sub-frame below) in the composite reference frame as the current-frame pixel block being encoded.

If the encoder determines (at 2210) that the search window is completely within the same sub-frame as the current pixel block, it proceeds (at 2220) to utilize the search window in the encoding operation to find a target pixel for the current pixel block. Otherwise, it adjusts (at 2215) the search window so that it does not fall outside of the target sub-frame. As mentioned above, the search window can be adjusted by cropping the portion that falls outside of the target sub-frame, or moving the search window in a direction away from the other sub-frame, so that the search window is entirely within the target sub-frame. After 2215, the encoder 2200 utilizes (at 2220) the remaining portion of the search window for the encoding operation.

b) Constraints on Target Sub-Pixels

In some embodiments, the encoder examines blocks that are aligned with sub-pixel locations (i.e., that are not aligned with integer pixel locations) in a reference during the motion estimation operation of some embodiments. From the reference frame, the decoder of some embodiments might also have to retrieve in some instances reference-frame blocks that are aligned with sub-pixel locations (i.e., that are not aligned with pixel locations).

The examination and retrieval of the blocks that are aligned with sub-pixel locations require the encoder or decoder to generate image values (e.g., luminance values) for the reference frame at the sub-pixel locations, which may correspond to pixel locations in the current frame during an encoding operation. These image values are generated through interpolation operations that at times require interpolating the image values of multiple (e.g., six) pixels that are vertically aligned in a column.

In some embodiments, the encoder places constraints on such interpolation operations to ensure that each vertical set of pixels that are used for an interpolation includes only pixels from the target sub-frame. Also, in some embodiments, the encoder places constraints on interpolation operations to ensure that each interpolation across a horizontal set of pixels does not rely on sub-pixel values that could only be generated through vertical interpolation operations that span two sub-frames.

Figure 23:
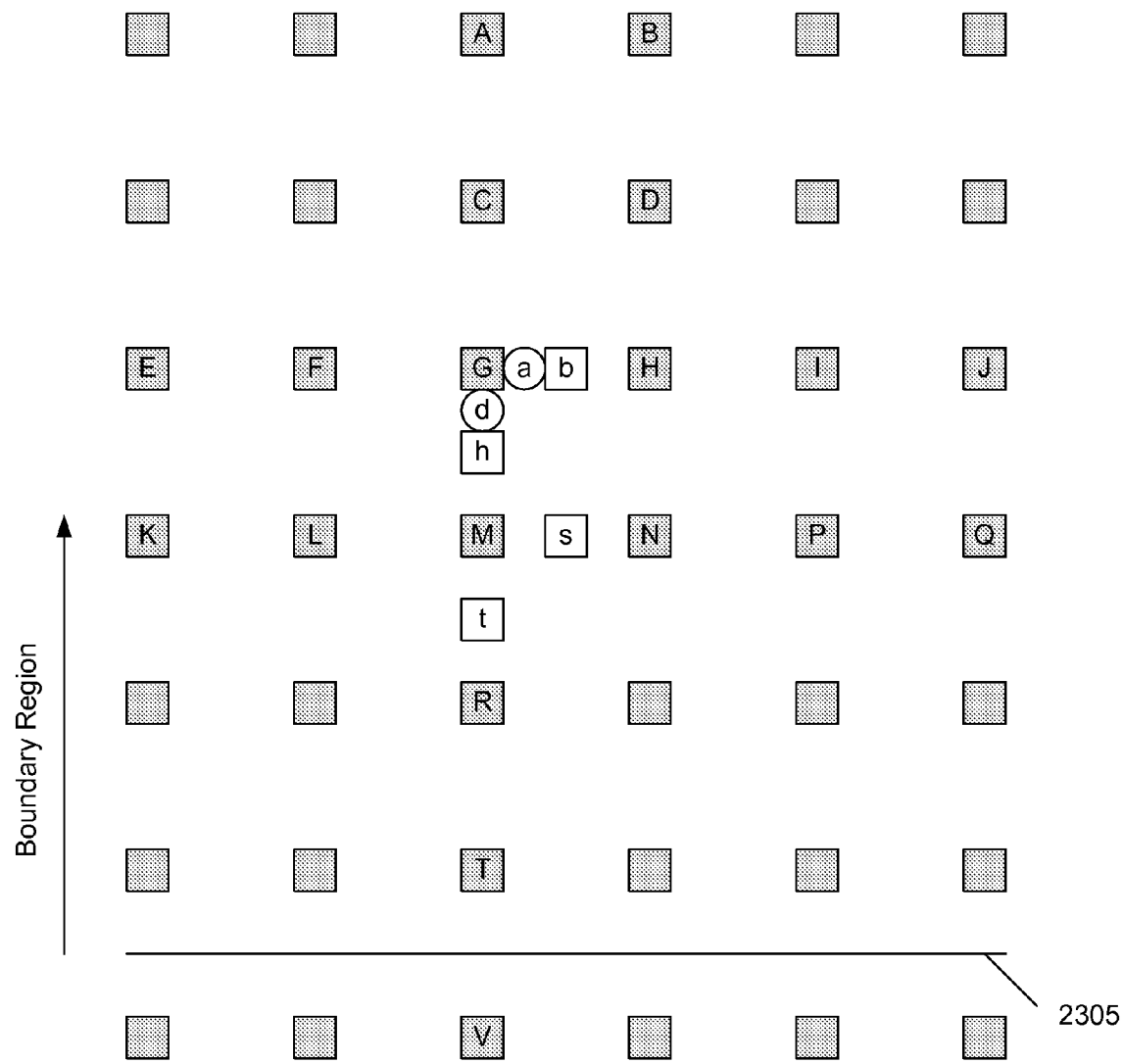
FIG. 23 is an example of integer pixel and fractional pixel locations in a portion of a sub frame.

FIG. 23 presents an example of interpolating across integer and non-integer pixel locations in a sub-frame. In this figure, the integer pixel locations are shown as shaded squares (e.g., squares A or B), half pixel locations are shown as white squares (e.g., squares b, h, s, or t), and quarter pixel locations are shown as circles (e.g., circles a and d). In order to simplify FIG. 23, only a few half pixel and quarter pixel locations are shown in this figure. The image values of the integer pixel locations are available without a need for interpolation. The values of fractional pixels at half and quarter level positions are not available and require the encoder to perform an interpolation in order to calculate their values.

Each interpolation operation is performed by a particular interpolation filter that has a particular length. In some embodiments, each interpolation operation for a target sub-pixel location is done by using a set of pixel and/or sub-pixel values located either horizontally or vertically with respect to the target sub-pixel location. For example, in order to calculate the value of a half pixel, some embodiments use an interpolation filter with the length of three, where length refers to the number of pixels that are used in each direction to calculate non-integer pixels.

In order to ensure that an interpolation operation does not span two sub-frames, the encoder in some embodiments uses the length of the interpolation filters to define sub-frame boundaries where the motion estimation operation cannot examine blocks that are aligned with sub-pixel locations.

For example, using an interpolation filter length of three, the half pixel b is interpolated by utilizing the values of E, F, G, H, I, and J pixels. The half pixel h is interpolated by utilizing the values of A, C, G, M, R, and T pixels. If the pixel values of the same sub-frame are to be used, a half pixel such as h, can only be interpolated if none of the pixels used in interpolation operation are located outside the current sub-frame. This requirement creates special constraints prohibiting the examination of sub-pixels that are located within the boundaries of the sub-frame. The lengths of these boundaries regions are equal to the length of the longest vertical interpolation filter.

For example, in FIG. 23, the line 2305 marks the boundary of the two adjacent sub-frames. For the case of an interpolation filter with a length of three, this boundary region would be any location that is three pixels away from the line 2305. For example, half pixel t is within such a boundary region. Calculation of the value of half pixel t would require interpolation of C, G, M, R, T, and V pixels. The pixel V is, however, outside the current sub-frame. The half pixel t value cannot be calculated using pixel within the current sub-frame should. Thus, the motion estimation operation does not use this half pixel value as a target location for a motion vector.

The half pixel s is also located within this boundary region. The half pixel s is, however, located within two integer pixels located in horizontal direction. The half pixel s can be calculated by interpolating K, L, M, N, P, and Q, which are all located within the same sub-frame. This half pixel, therefore, can be used as a target location for a motion vector.

In some embodiments, the quarter pixel values are calculated by averaging and upward rounding of the two nearest integer or half pixel values. Calculation of the quarter pixel values should therefore have the same constraints as the half pixels required in calculating their values.

Figure 24:
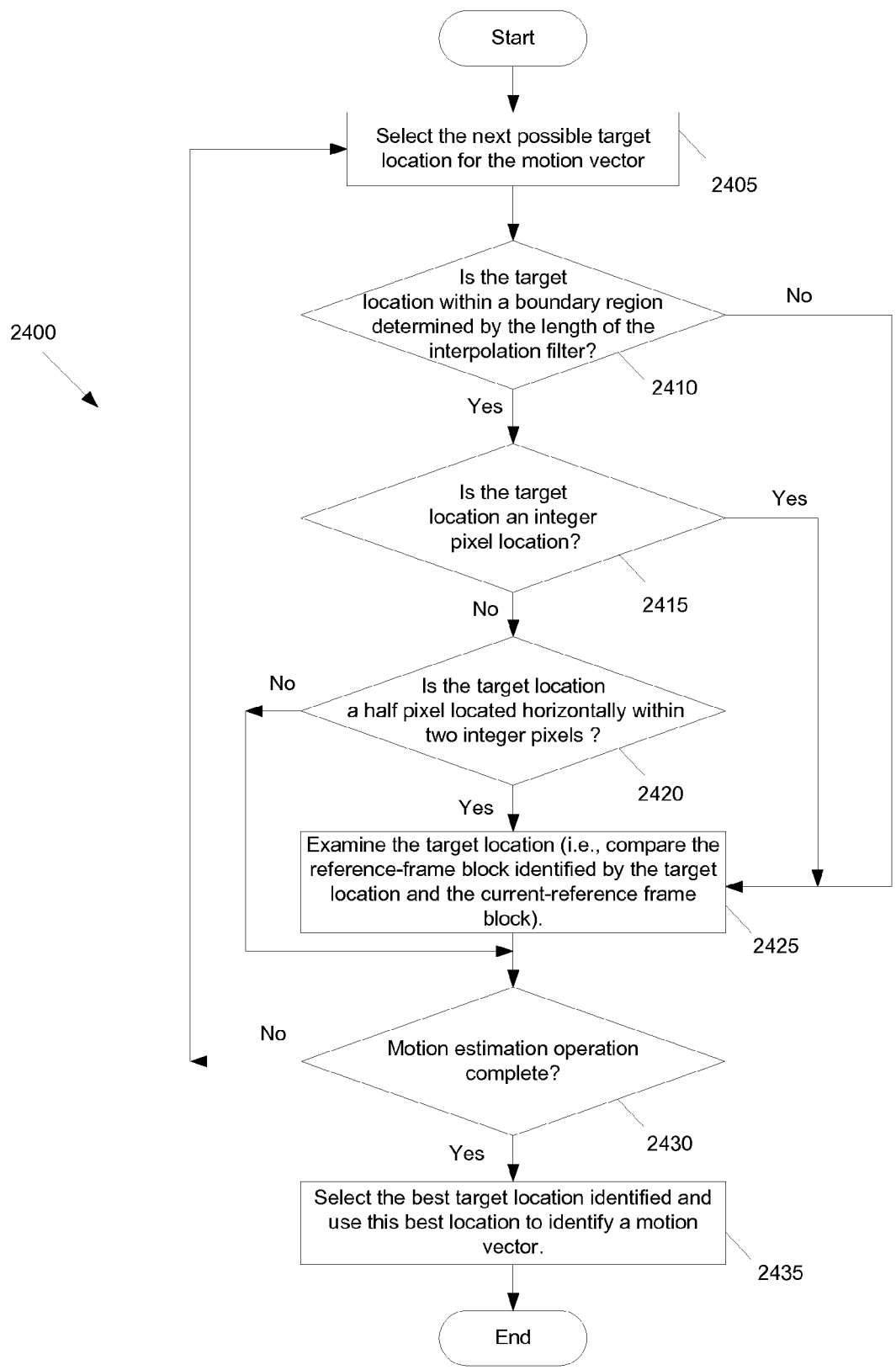
FIG. 24 is a flow chart illustrating how the encoder constraints motion vectors target locations in some embodiments.

FIG. 24 illustrates a process 2400 that a motion estimation process of the encoder 660 uses to determine a target location in a composite reference frame for a motion vector. At initialization not shown in FIG. 24, the encoder 660 utilizes the length of the interpolation filter to establish a set of buffer regions at the boundaries of sub-frames.

Figure 25:
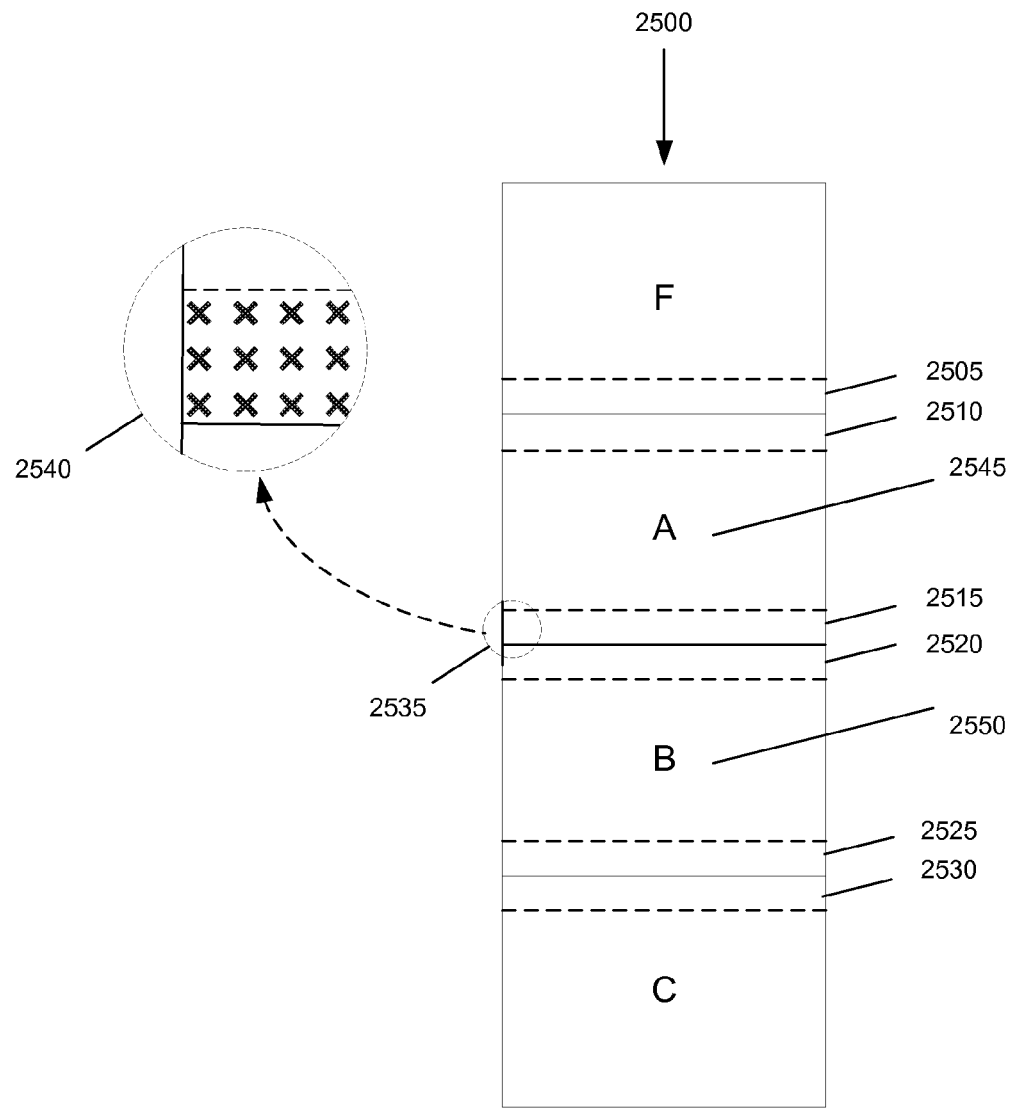
FIG. 25 illustrates motion vector boundary buffer regions in some embodiments.

FIG. 25 presents an example that illustrates boundary regions for a 1×4 composite image buffer 2500 when the length of the interpolation filter is three pixels. As shown in FIG. 25, the boundary buffer regions 2505-2530 are within three pixels of sub-frame boundaries. For example, one section 2535 of the boundary buffer region 2515 is enlarged at 2540 to illustrate that the boundary region 2515 is located inside Participant A's sub-frame 2545 and covers an area of three pixels deep across the boundary with Participant B's sub-frame 2550.

At 2405, the process selects the next possible target for the motion vector. If the process determines (at 2410) that the target location is not within one of the boundary regions, the process examines (at 2425) the target location (i.e., compares the reference-frame block identified by the target location and the current-reference frame block). After 2425, the process determines (at 2430) whether it should terminate the motion estimation operation. If not, the process returns to 2405 to select another target location. Otherwise, the process selects (at 2435) the best target location identified by the process 2400 at 2425, and then uses (at 2435) this best location to identify a motion vector. After 2435, the process ends.

When the process determines (at 2410) that the target location is within one of the boundary regions, the process determines (at 2415) whether the target location is an integer location. If so, the process transitions to 2425, which was described above. If not, the process determines (at 2420) whether the target location is a half pixel located horizontally between two integer pixels in the same sub-frame. When the target location is determined to be a half pixel located horizontally between two integer pixels in the same sub-frame, the process transitions to 2425, which was described above. On the other hand, when the target location is determined (at 2420) not to be a half pixel located horizontally between two integer pixels in the same sub-frame, the process foregoes examining the selected target location, and simply transitions to 2430, which was described above.

2. Intrablock Encoding Constraints

Another compression operation performed by the encoder 660 is macroblock intra prediction. The macroblock intra prediction operation is predicting the value of a macroblock from the values of selected pixels in neighboring macroblocks. In order to make participant's sub-frames independent, the source pixels for intra prediction should be selected from the macroblocks that are located within the current sub-frame.

Figure 26:
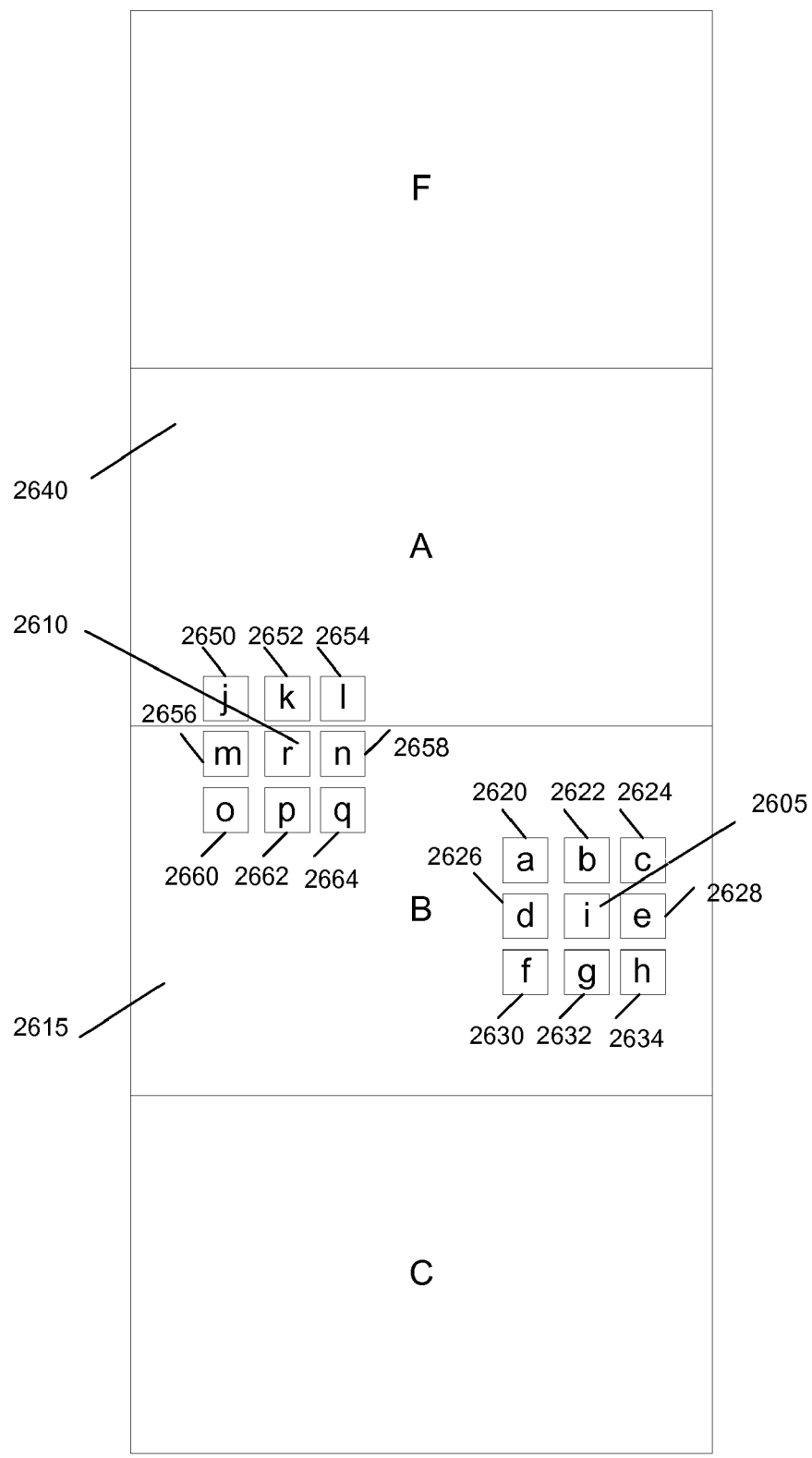
FIG. 26 illustrates restrictions that the encoder places on macroblock intra prediction in some embodiments.

FIG. 26 illustrates two macroblocks 2605 and 2610 for which the encoder 660 is doing intra prediction in some embodiments of the invention. As shown in this example, both macroblocks are located inside Participant B's sub-frame 2615. Macroblocks "a" to "h" 2620-2634 that are surrounding macroblock "i" 2605 are all located inside the same sub-frame 2615. Using any one of these macroblocks to perform intra prediction for macroblock "i" would create macroblock dependencies only within Participant B's sub-frame. Therefore, the encoder 660 is allowed to use either one of these macroblocks when doing intra prediction for macroblock "i" 2605.

On the other hand, macroblock "r" 2660 is located close to the boundary of Participant B's sub-frame 2615 and Participant A's sub-frame 2640 such that some of the neighboring macroblocks such as "j", "k", and "l" 2650-2654 are in Participant A's sub-frame. Since use of these macroblocks would create dependencies among Participant B and Participant A's sub-frames 2615 and 2640, the encoder 660 would not use these macroblocks to do intra prediction for macroblock "r" 2610. Macroblocks "m" to "q" 2656-2664 are, however, within the same sub-frame as macroblock "r" 2610. Encoder 660 is, therefore, allowed to use them for macroblock "r" 2610 intra prediction. The encoder may not use some macroblocks such as "n" to "q" 2658-2664 due to raster scan or similar techniques used. Therefore, the intra prediction constraint described here, only allows or disallows (rather than require) the encoder to utilize certain macroblocks for intra prediction of a particular macroblock.

3. Loop Filter Constraints

The encoder may encode adjacent blocks of pixels using different encoding methods. For example, the encoder may encode a block of pixels using inter block encoding, intra block encoding, or may skip the block altogether. Therefore, the adjacent pixel blocks encoded using different encoding methods can have different values, even though they should have similar values. To eliminate these artifacts, the encoder applies a loop filter to a reference frame before that frame is utilized in motion estimation operation.

In some embodiments, a deblocking filter is utilized for loop filtering. The deblocking filter is also used to help reduce the appearance of block like artifacts that appear in highly compressed video data, thereby enhancing the video frame. Depending on the video codec algorithm used, either the decoder or both the decoder and encoder may use deblocking filters. Since the participants' sub-frames are kept independent, no filtering should be done between the pixels located in different participants' sub-frames.

Figure 27:
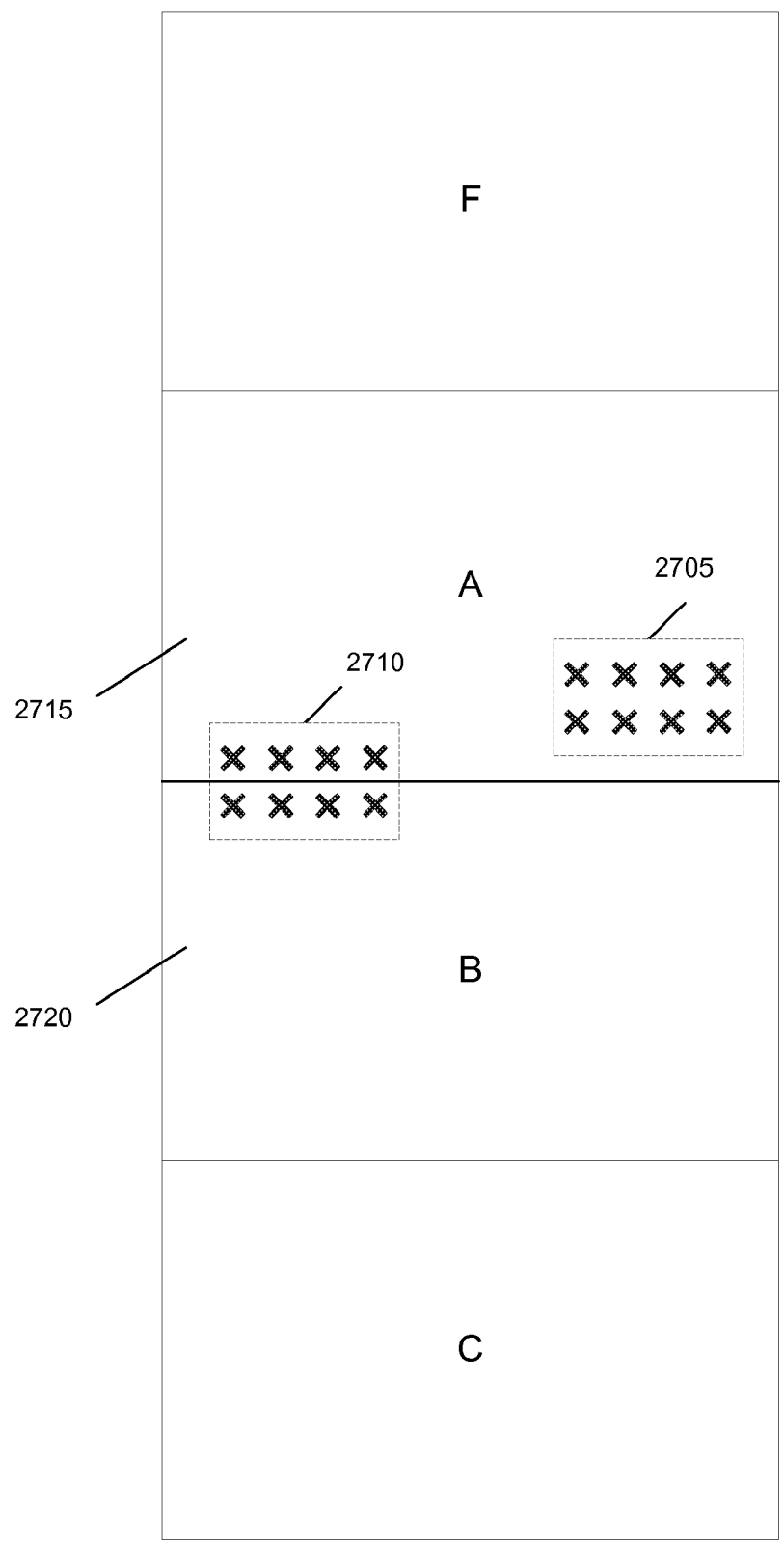
FIG. 27 illustrates the restrictions that some embodiments place on group of pixels that deblocking filter uses.

FIG. 27 illustratively shows how a group of pixels are selected for filtering in some embodiments. In order to clarify the example, the pixels and the sub-frames are not drawn to scale. In the example shown in FIG. 27, two groups of pixels 2705 and 2710 are selected for filtering. All pixels in the first group 2705 are located within the boundaries of Participant A's sub-frame 2715. This group of pixels is, therefore, allowed to be filtered.

The second group of pixels 2710, however, crosses the boundary between Participant A and Participant B's sub-frames 2715 and 2720 respectively. Since Participant A's sub-frame 2615 and Participant B's sub-frame 2620 are kept independent, any similarities or differences in the adjacent pixel values located in different sub-frames are coincidental and not the result of the encoding operation. This group of pixels, therefore, should not be selected for filtering.

Figure 28:
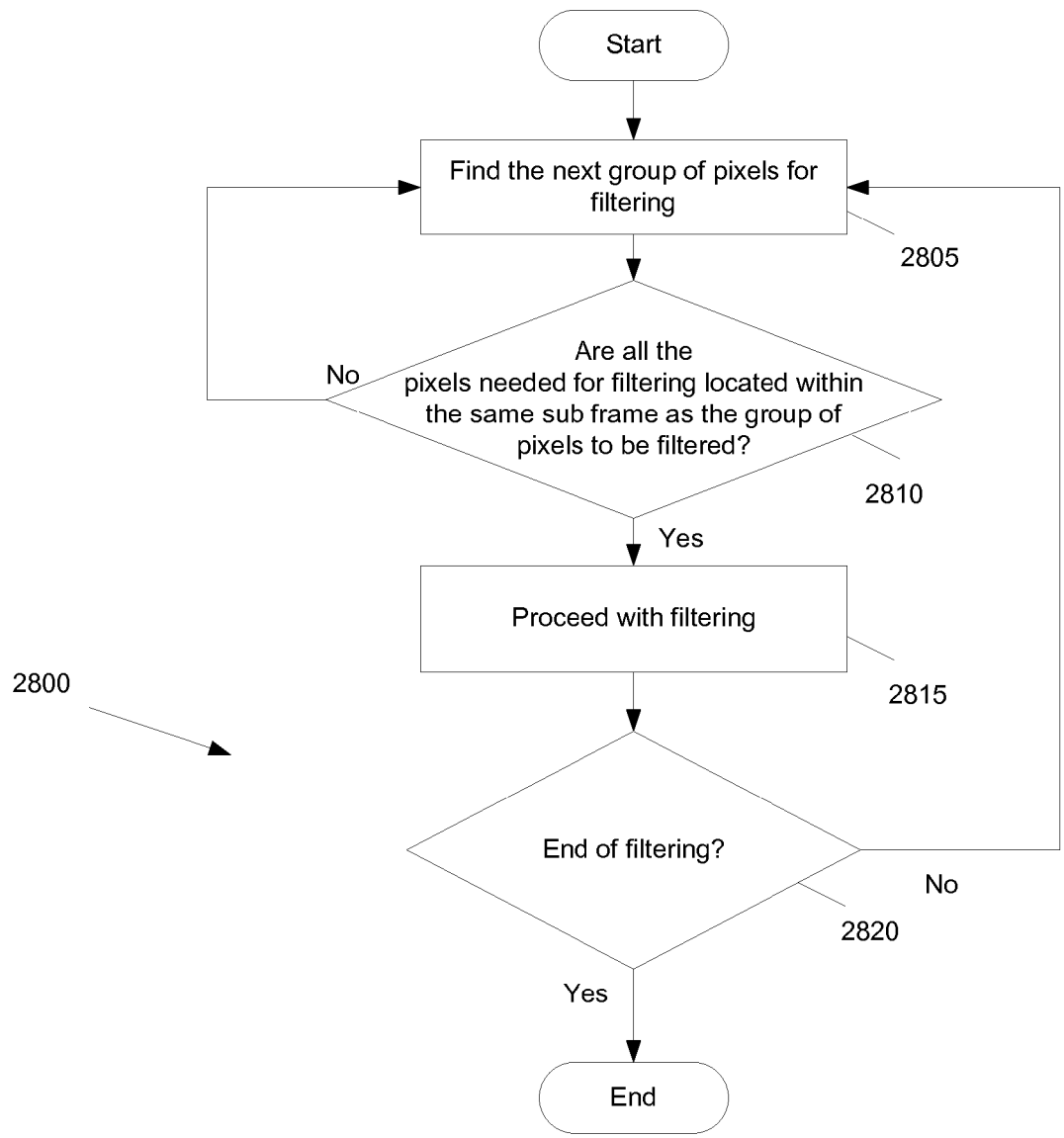
FIG. 28 is a flow chart illustrating how some embodiments limit the deblocking filter to pixels in the same sub frame.

FIG. 28 illustrates a process 2800 that some embodiments of the invention utilize to apply constraints to filtering. The process 2800 first identifies (at 2805) a group of pixels for filtering. If all pixels needed for the filtering are determined (at 2810) to be located within the same sub-frame as the group of pixels to be filtered, the process proceeds (at 2815) with filtering. Otherwise, if process 2800 determines (at 2810) that all the pixels needed for filtering are not located within the same sub-frame as the group of pixels to be filtered, the group is not selected for filtering and the process transitions back to refine (at 2805) the group or to find the next group of pixels for filtering. After 2815, the filtering process 2800 determines (at 2820) whether the filtering process is over. If so, the process 2800 terminates. Otherwise, the process returns to 2805 to find and deblock the next group of pixels.

C. Constraining Encoding to Save Bandwidth

The encoding constraints mentioned above allow the focus point module to generate a composite frame that has different type of frames from different conference participants. For example, a certain composite frame may comprise of a relatively larger intra-encoded sub-frame (I sub-frame) for one participant and relatively smaller inter-encoded sub-frames (P or B sub-frame) for one or more of the other participants.

In some embodiments, the encoder sends such composite frames with mixed intra-encoded and inter-encoded sub-frames to address errors in transmission of prior composite frames. Such mixed composite frames conserve the network bandwidth, which might be scarce during the video conference. Before describing this further, a brief overview of the handshake protocol used by the encoders and decoders of some embodiments is first described below.

1. Protocols

In some embodiments, an encoder of one participant (e.g., the focus-point module encoder) uses a handshaking protocol to communicate with the decoder of another participant (e.g., a non-focus point module decoder) to decide whether a frame is dropped during transmission. For instance, when the non-focus decoder determines that it has not completely received one or more parts of a sub-frame relating to a particular participant, the decoder sends a refresh request to the focus-point encoder to identify the corrupted sub-frame. Until the decoder receives data from the encoder that will stop error propagation (e.g., receives an intra-encoded sub-frame for the particular participant), the decoder periodically transmits the refresh request to the encoder. In some embodiments, a sub-frame is divided into several slices (e.g., two slices) with each slice including several macroblocks. In these embodiments, the parts of the sub-frame that the decoder analyzes for completeness are the slices.

2. Bandwidth Savings

Several examples of bandwidth saving techniques are described below. The techniques are explained by using MPEG-4 examples. In MPEG-4, each instance of a participant's image is referred to as a frame. The frames are either I, P, or B frames. I frames are encoded using only the information contained within the frames themselves. They can, therefore, be decoded independent of other frames. I frames are, however, much larger than P and B frames.

P and B frames are encoded using the information in other I or P frames. They are therefore, smaller than I frames and requires less bandwidth to transmit. Typically, one I frame and several P and B frames are grouped together in a repetitive structure. The I frame and the P frames in the repetitive structure are referred to as anchor frames and are required to generate the other P and B frames. When an I or P frame is missed during transmission, the rest of the frames in the repetitive structure that depend on the missing frame become useless and cannot be decoded anymore.

The first example in the following sub-sections describes different treatment of different sub-frames within a composite frame during a multi-participant conference to save bandwidth. The next example describes a method of smoothing out bandwidth by transmitting different parts of an I frame in several subsequent frames. The third example describes the use of a long term frame reference to synch up after a frame is lost during transmission without the need to transmit an I frame.

a) Refreshing a Particular Sub-Frame in a Composite Frame

Figure 29:
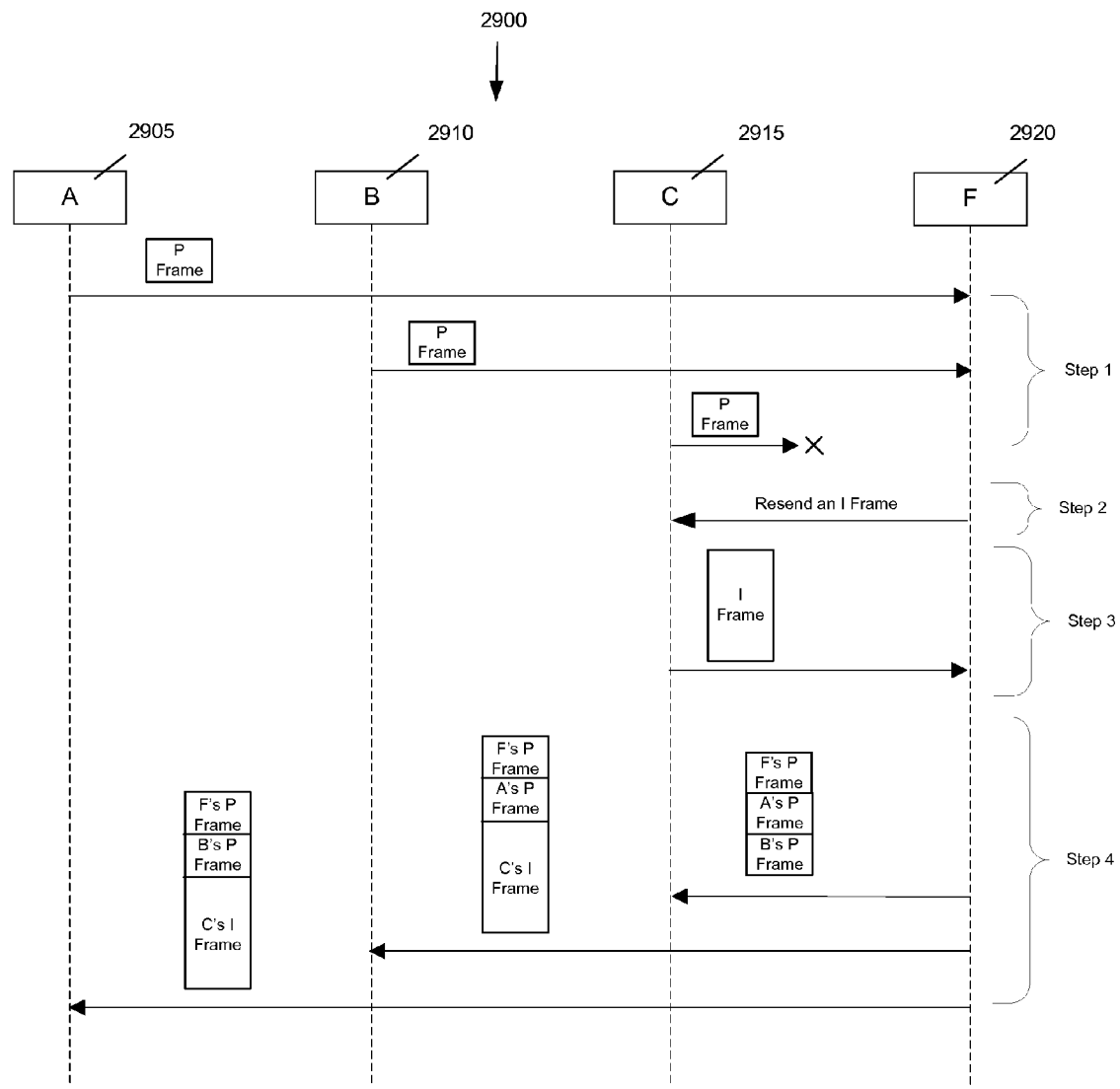
FIG. 29 illustrates different treatment of sub frames in a composite frame in some embodiments.

In some embodiments of the invention, the focus point module 510 and the non-focus modules 515 utilize the total independence of the sub-frames to save bandwidth during retransmission of lost frames. The sequence diagram 2900 in FIG. 29 illustrates an example of the frames exchanged in some embodiments in which Participants A, B, C, and a focus point F are in conference. In this sequence diagram, the vertical axis represents the passage of time (from top to bottom), and the horizontal axis shows the passing of messages between objects. Participant A, B, and C's non-focus modules 2905-2915 and the focus module 2920 are depicted as labeled rectangles at the top with vertical dashed lines demarking the lifeline or the time during which each module is in existence. Messages between these modules are drawn as horizontal arrows from the lifeline of the sending object to the lifeline of the receiving object.

The frames exchanged between the focus point module 2920 and the non-focus modules 2905-2915 are illustrated with the arrowed lines originating and terminating from the modules. Each frame represents either a participant's sub-frame sent from one of the non-focus point modules 2905-2915 or a composite frame sent by the focus point module 2920.

In this example, at Step 1, each non-focus module sends a P frame to the focus point 2920. As shown in FIG. 29, the frame sent by participant C's non-focus module 2915 is, however, lost and is not received by the focus point 2920. Since the focus point is at the middle of transmitting and receiving a set of frames encoded in a repetitive structure, it would require a new I frame from participant C's non-focus point module 2915 in order to generate subsequent frames.

Therefore, at step 2, the focus point 2920 requests participant C's non-focus point module 2915 to send an I frame. In the next step 3, participant C 2915 sends an I frame to the focus point 2920. Subsequently, in step 4, the focus point module 2920 makes composite frames from participants A, B, and focus-point participant's existing P frames and participant C's I frame received in step 3 and sends them to participants A, B, and C after deleting each participant's own image from the composite that particular participant receives. The transmission then continues with all participants being able to decode all following frames they receive.

Figure 30:
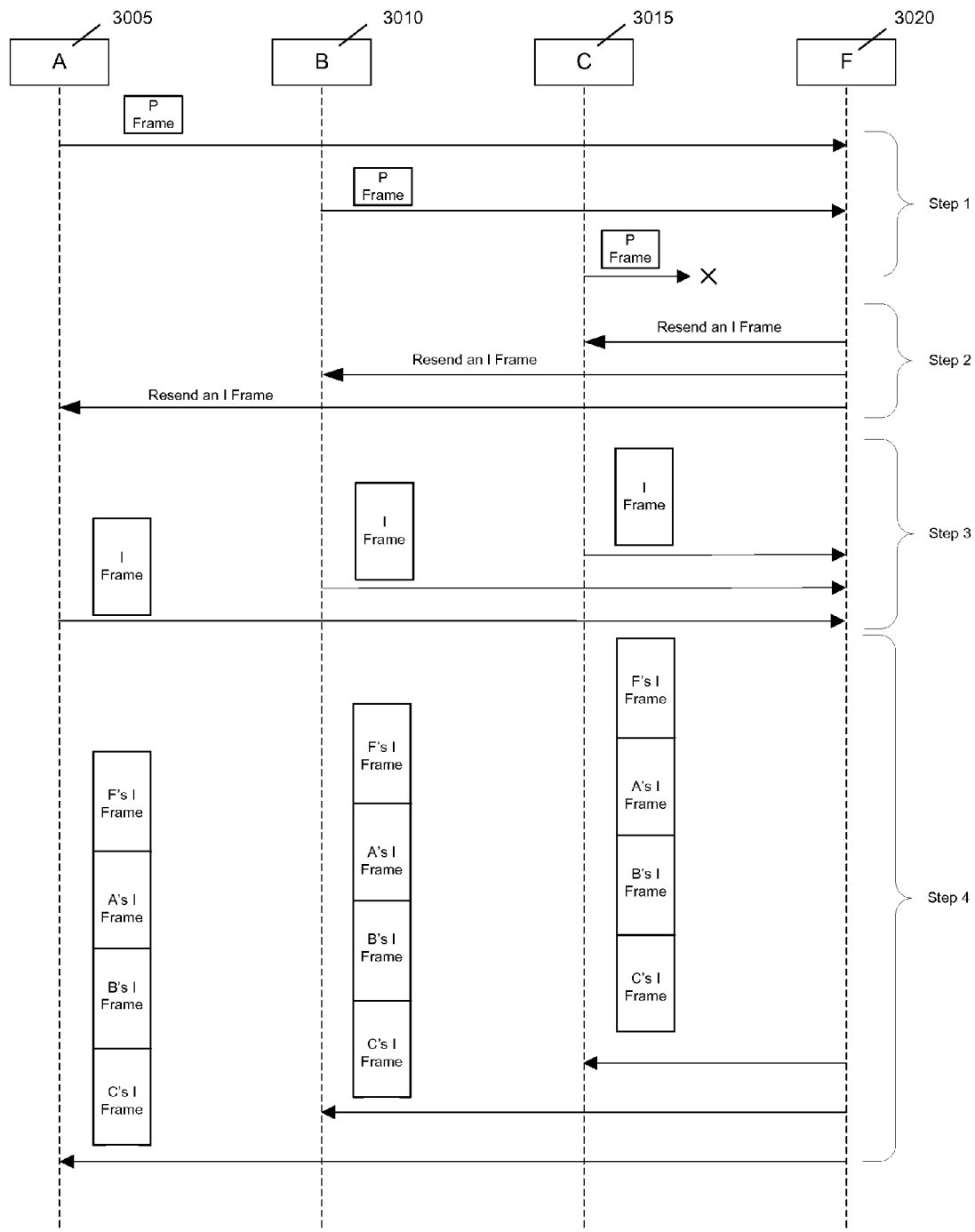
FIG. 30 illustrates different treatment of sub frames in a composite frame in some embodiments.

This refresh method illustrated in FIG. 29 has an advantage over the situation where the encoder cannot keep the sub-frames of the participants independent and has to request retransmission of I frames from all participants. FIG. 30 illustrates an example of how the retransmission had to be done if the participants' sub-frames in the composite frame were not kept separately.

If the participants' sub-frames were not kept separately in the composite frame, the focus point module 3020 would have to request in step 2 new I frames from all non-focus point modules 3005-3015. Subsequently, in step 3, all non-focus modules 3005-3015 would have to send I frames to the focus point module 3020. In step 4, the focus point 3020 would then have to generate composite frames from all participants' I frames and then transmit these composite frames, which would be rather large. The approach illustrated in FIG. 29, on the other hand, would not suffer from such large composite frames as it would only transmit intra-encoded data for only one participant.

Sending a composite frame with mixed intra-encoded and inter-encoded sub-frames is also highly beneficial when the focus-point encoder tries to refresh a sub-frame for a first particular participant that was not properly received by a second participant, even though the focus-point had transmitted the first participant's sub-frame to the second participant.

b) Refreshing a Frame over a Number of Subsequent Frames

Some embodiments extend the above-described encoding constraints to one or more sections of a frame (e.g., to one or more slices), in order to break up data needed to refresh a frame (e.g., a sub-frame in a multi-participant conference, or a frame in a peer-to-peer conference) into multiple subsequent frames. For instance, some embodiments define the encoding constraints not with respect to the sub-frame boundaries in a composite frame, but rather define these constraints at slice boundaries. The use of these constraints then allows the encoder to break up data needed to refresh a frame into multiple subsequent frames.

Such an approach would be beneficial in peer-to-peer and multi-participant conferences. During a peer-to-peer conference, the encoder may have to retransmit an I frame to start a new MPEG repetitive structure when the encoder determines that a previous frame was lost. Such an I frame might consume a lot of the network bandwidth. Therefore, the encoder in some embodiment provides intra-encoded data over two or more frames for sections of the frames that are smaller than the entire frames.

Figure 31:
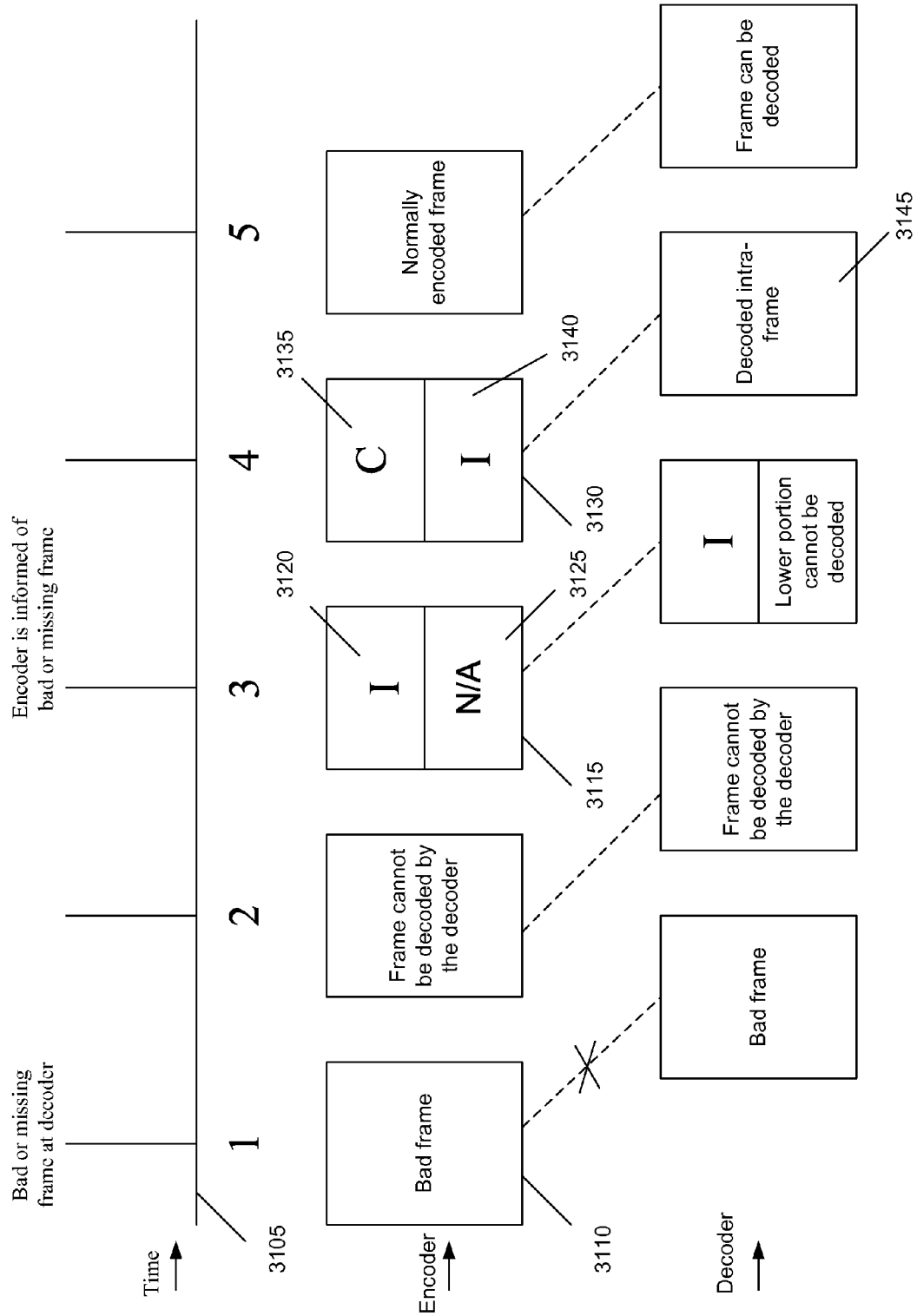
FIG. 31 illustrates different treatment of sub frames within same frame in some embodiments.

FIG. 31 illustrates one example of this for the case of a peer-to-peer conference. In this example, two participants are engaged in peer-to-peer transmission. Each participant has an encoder and a decoder. Each decoder informs the other party's encoder when it receives a good frame. The example is shown for the frames that one party's encoder is sending to the other party's decoder.

As shown in the time line 3105, the encoder sends a frame 3110 at time 1, which is corrupted or lost in transmission. Due to the operational and transmission delays, the encoder does not realize the error until time 3. The encoder reaches this realization either when the decoder informs the encoder that there were bit errors in the frame or the encoder notices that an error has occurred during transmission of frame 3110. Since the rest of the MPEG repetitive structure cannot be decoded without frame 3110, the encoder has to retransmit an I frame to start a new repetitive structure.

Since the I frame is much larger than P or B frames, the encoder divides the next frame 3115 into two slices, a top slice 3120 and a bottom slice 3125. It then sends the top slice 3120 as an intra-encoded slice and discards the bottom slice 3125 (i.e., does not send any video data for bottom slice 3125). The encoder then divides the next frame 3140 into a top slice 3135 and a bottom slice 3140. However, for this frame, the encoder interblock encodes the top slice 3135 in view of the above-described encoding constraints, while intrablock encoding the bottom slice 3140.

At time 4, The decoder then uses the combination of the received top slice 3120 and the interblock encoded data for the subsequent slice 3135 to generate the top half of the decoded refresh frame 3145. The decoder defines the bottom half of the decoded refresh frame 3145 to be the bottom slice 3140. After time 4, all subsequent frames can be encoded normally without being divided into separate sub-frames until the encoder notices the next bad or missing sub-frame.

Other embodiments might split the intrablock encoded data into more than two frames. Moreover, this technique can be used to break up intrablock encoded data for a particular sub-frame among two or more composite frames in a multi-participant conference. In addition, the above described approach can be used to transmit I frame data in other contexts that have nothing to do with transmission errors. For example, this approach can be used each time a new I frame has to be established in a video sequence of a video conference.

c) Use of Long Term Reference Frame to Save Bandwidth

In some embodiments of the invention, the encoder uses the above mention handshake between the encoder and decoder to keep track of the last known perfect reference frame (either an I frame or a P frame), that the decoder has received. The decoder also saves this last known perfect frame or long term reference frame. In case of a transmission error, the encoder then starts encoding the subsequent frames using the saved long term reference frame. The encoder, therefore, stops further error propagation without having to transmit a large I frame. This technique can be used in peer-to-peer as well as multi-participant conferences.

Figure 32:
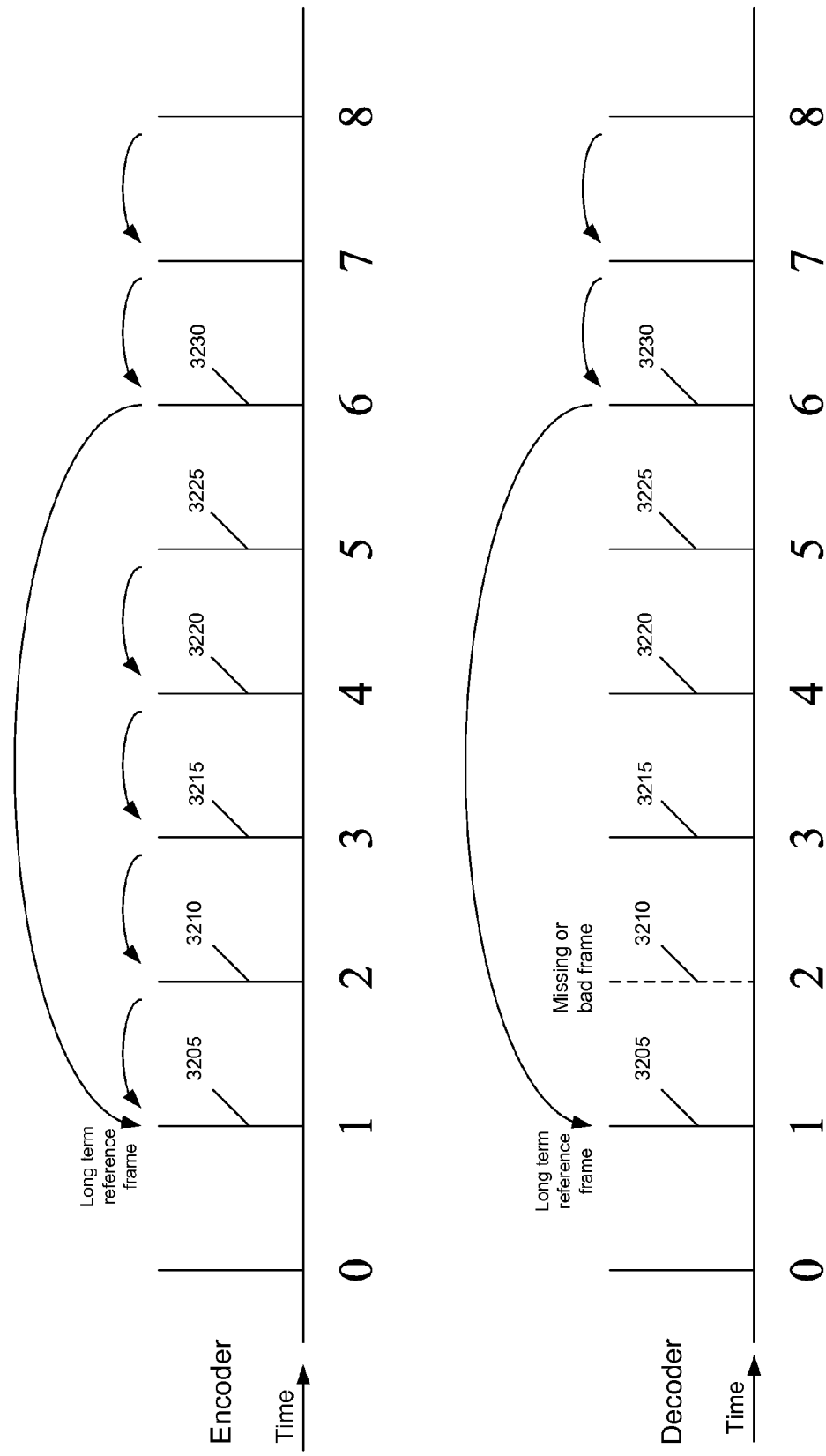
FIG. 32 illustrates the use of long term reference frame in some embodiments to save bandwidth.

FIG. 32 illustrates an example of the use of the long term reference frame. In this example, the encoder and decoder know that frame 3205 is the last know perfect reference frame received by the decoder. This frame can be either an I frame or a P frame. At time 2, the decoder either does not receive frame 3210 or notices that it has bit errors and notifies the encoder. Due to the delay between the time a frame is lost at the decoder and the time encoder is informed, the encoder in this example determines at time 6 that the decoder has not received frame 3210. By this time, all frames transmitted at time 3 to 5 were dependent on frame 3210 and are therefore not usable by decoder.

At time 6, the encoder stops using frames 3210-3225 to encode subsequent frames. Instead, the encoder uses the long term reference frame 3205 to encode frame 3230. Since the decoder has saved a copy of this frame, it is capable of decoding frame 3230. The encoder encodes all subsequent frames using frame 1 or frame 6 as reference which are both received by the decoder and the transmission is, therefore, synched up.

V. Computer System

Figure 33:
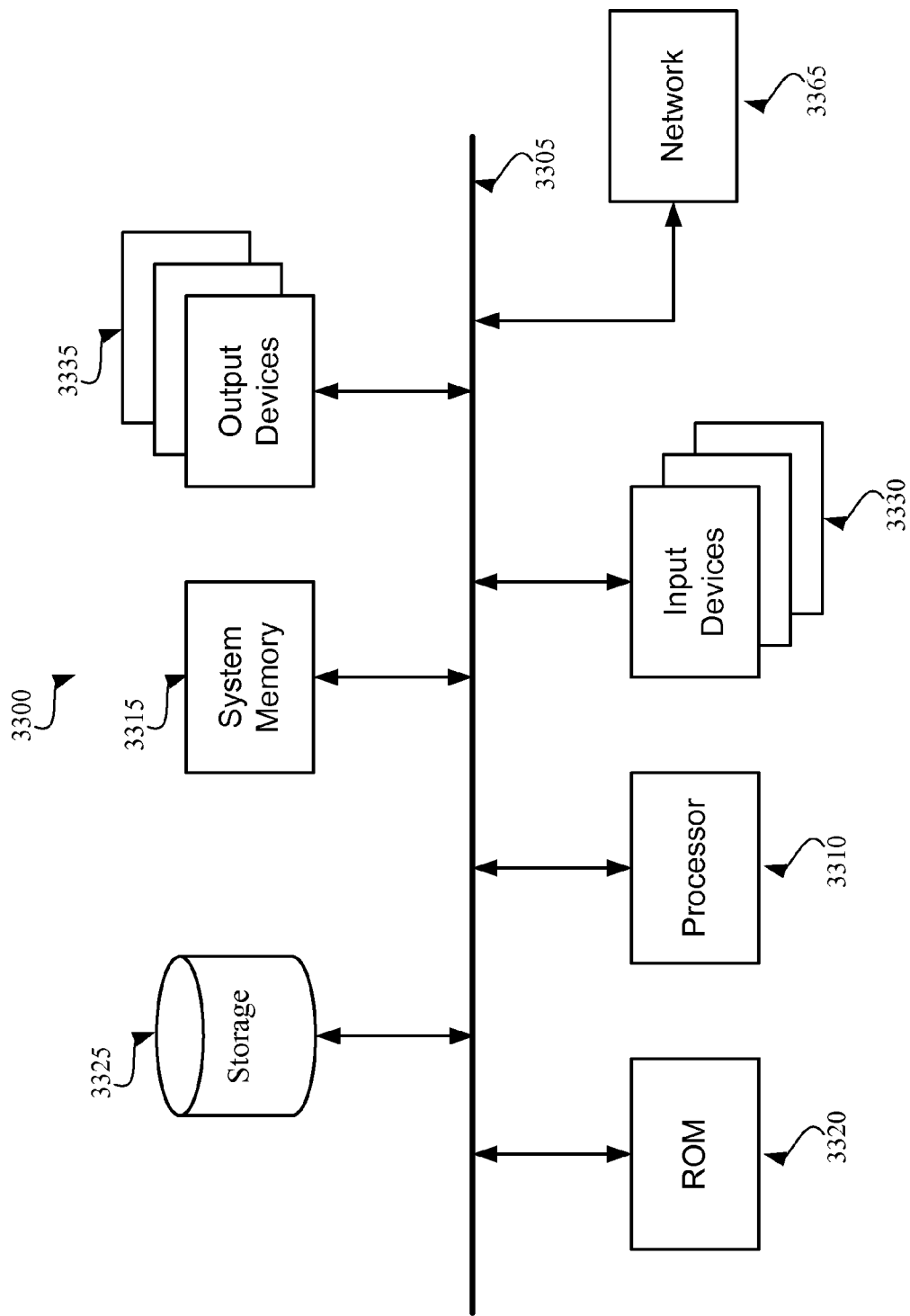
FIG. 33 presents a computer system with which one embodiment of the invention is implemented.

FIG. 33 conceptually illustrates a computer system with which some embodiments of the invention is implemented. Computer system 3300 includes a bus 3305, a processor 3310, a system memory 3315, a read-only memory 3320, a permanent storage device 3325, input devices 3330, and output devices 3335.

The bus 3305 collectively represents all system, peripheral, and chipset buses that support communication among internal devices of the computer system 3300. For instance, the bus 3305 communicatively connects the processor 3310 with the read-only memory 3320, the system memory 3315, and the permanent storage device 3325.

From these various memory units, the processor 3310 retrieves instructions to execute and data to process in order to execute the processes of the invention. The read-only-memory (ROM) 3320 stores static data and instructions that are needed by the processor 3310 and other modules of the computer system. The permanent storage device 3325, on the other hand, is a read-and-write memory device. This device is a non-volatile memory unit that stores instruction and data even when the computer system 3300 is off. Some embodiments of the invention use a mass-storage device (such as a magnetic or optical disk and its corresponding disk drive) as the permanent storage device 3325. Other embodiments use a removable storage device (such as a floppy disk or zip® disk, and its corresponding disk drive) as the permanent storage device.

Like the permanent storage device 3325, the system memory 3315 is a read-and-write memory device. However, unlike storage device 3325, the system memory is a volatile read-and-write memory, such as a random access memory. The system memory stores some of the instructions and data that the processor needs at runtime. In some embodiments, the invention's processes are stored in the system memory 3315, the permanent storage device 3325, and/or the read-only memory 3320.

The bus 3305 also connects to the input and output devices 3330 and 3335. The input devices enable the user to communicate information and select commands to the computer system. The input devices 3330 include alphanumeric keyboards and cursor-controllers. The output devices 3335 display images generated by the computer system. The output devices include printers and display devices, such as cathode ray tubes (CRT) or liquid crystal displays (LCD).

Finally, as shown in FIG. 33, bus 3305 also couples computer 3300 to a network 3365 through a network adapter (not shown). In this manner, the computer can be a part of a network of computers (such as a local area network ("LAN"), a wide area network ("WAN"), or an Intranet) or a network of networks (such as the Internet). Any or all of the components of computer system 3300 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. For instance, instead of encoding after producing a composite frame, the focus-point module 510 of some embodiments might encode the frames of the non-focus participant before packaging the encoded frames into one composite frame for transmission.

As mentioned above, some embodiments perform compositing at set intervals that may allow a late arriving frame (such as A3 in FIG. 10) to override a previous frame (such as A2 in FIG. 10) that has not yet been sent. Other embodiments, however, might prevent a frame that has not yet been sent from being discarded. For instance, some embodiment might not wait to send out composite frames at set intervals, but instead might send out composite frames whenever a certain number of new frames have been received from the non-focus participants. Thus, one of ordinary skill in the art would understand that the invention is not limited by the foregoing illustrative details, but rather is to be defined by the appended claims.

What claimed is:

1. A method of encoding an image during a video conference with multiple participants, the method comprising:
    generating a composite image comprising at least two sub-images for at least two participants; and
    constraint encoding each sub-image separately, wherein said constraint encoding comprises encoding each sub-image based on a set of constraints that allow the encoding of the sub-image to be independent of the encoding of any other sub-image.

2. The method of claim 1,
    wherein the encoding comprises performing a motion estimation process for an inter-block encoding operations,
    wherein the set of constraints includes a constraint on a location of a search window used during the motion estimation process.

3. The method of claim 2, wherein performing the motion estimation process comprises performing a search within a target sub-image, wherein the location constraint requires the search window to be located within the target sub-image.

4. The method of claim 3 further comprising:
    identifying a search window that partially falls outside the target sub-image; and
    cropping the identified search window so that it entirely falls within the target sub-image.

5. The method of claim 3 further comprising:
    identifying a search window that at least partially falls outside the target sub-image; and
    moving the identified search window so that it entirely falls within the target sub-image.

6. The method of claim 1, wherein the encoding comprises examining blocks that are aligned with sub-pixel locations, wherein the set of constraints includes a constraint on a region within which the blocks aligned with the sub-pixel locations are examined.

7. The method of claim 6, wherein said examination comprises performing interpolation operations for sets of image values of sets of pixels.

8. The method of claim 7, wherein said interpolation operations are performed on sets of horizontal pixels and sets of vertical pixels.

9. The method of claim 8, wherein a particular vertical set of pixels includes only pixels within a particular sub-image.

10. The method of claim 8, wherein a particular horizontal set of pixels does not include sub-pixel values that are only generated through vertical interpolation operations that span more than one sub-image.

11. The method of claim 7 further comprising establishing a set of boundary regions between the sub-images, wherein dimensions of the boundary regions are determined by a number of pixels in the sets of pixels used for said interpolation operations.

12. The method of claim 11, wherein said interpolation operations are performed on sets of horizontal pixels, wherein a particular horizontal set of pixels includes pixels within a boundary region of one particular sub-image.

13. The method of claim 11 further comprising foregoing examining blocks aligned with a plurality of sub-pixel locations that are within a particular boundary region.

14. The method of claim 13, wherein the blocks that are not examined within the boundary regions are a plurality of blocks aligned with a plurality of half pixel locations.

15. The method of claim 14 further comprising examining a plurality of blocks aligned with a plurality of half pixel locations that are within the boundary regions and are located between two integer pixel locations within the same boundary region.

16. The method of claim 13, wherein the blocks that are not examined within the boundary regions are a plurality of blocks aligned with quarter pixel locations.

17. The method of claim 16 further comprising examining a plurality of blocks aligned with a plurality of quarter-pixel locations that are within the boundary regions and are interpolated utilizing integer pixel locations and half-pixel locations within two integer locations in the same boundary region.

18. The method of claim 1, wherein the constraint encoding comprises:
    performing intra prediction for a set of pixels in a particular sub-image; and
    excluding from the intra prediction sets of pixels that fall outside of the particular sub-image.

19. The method of claim 1 further comprising:
    performing a loop-filter operation during the encoding of a particular sub-image; and
    excluding pixels that are not in the particular sub-image from the loop-filter operation.

20. The method of claim 1, wherein said generating and encoding are performed at a computing device of a first participant that serves as a central distributor of video content during the video conference.

21. A method of distributing video content in a video conference between at least two participants, the method comprising:
    detecting a condition requiring refreshing of a first participant's image data through intra-block encoded data;
    intra-block encoding a portion of a first image of the first participant;
    transmitting the intra-block encoded portion of the first image to a second participant;

intra-block encoding a first portion of a second image of the first participant; and transmitting the intra-block encoded portion of the second image to the second participant, wherein the intra-block encoded portions of the first and second images at least partially refresh the first participant's image data.

22. The method of claim 21 further comprising:

inter-block encoding a second portion of the second image; and transmitting the inter-block encoding of the second portion to the second participant, wherein the second portion corresponds to the portion of the first image that was intra-block encoded.

23. The method of claim 21, wherein the video conference is a peer-to-peer conference.

24. The method of claim 21, wherein the first and second images are first and second portions of an I frame.

25. The method of claim 21, wherein said condition is a transmission error from the first participant to the second participant.

26. The method of claim 21, wherein the intra-block encoded portions of the first and second images fully refresh the first participant's image data.

27. The method of claim 21 further comprising:

intra-block encoding a portion of at least a third image of the first participant; and transmitting the intra-block encoded portion of the third image to the second participant, wherein the intra-block encoded portions of the first, second, and third images at least partially refresh the first participant's image data.

28. The method of claim 27, wherein the intra-block encoded portions of the first, second, and third images completely refresh the first participant's image data.

29. A method of distributing video content in a video conference between at least two participants, the method comprising:

storing a long term reference frame at a first participant;

notifying a second participant that the first participant has dropped video data transmitted by the second participant; and receiving, from the second participant, inter-encoded data, wherein the inter-encoded data is defined by reference to the long term reference frame.

30. The method of claim 29, wherein the video conference is a peer-to-peer conference.

31. The method of claim 29, wherein the long term reference frame is also stored at the second participant.

32. The method of claim 29, wherein the long term reference frame is one of an I frame and a P frame.

33. A method of distributing video content in a video conference having a plurality of participants, the method comprising:

at a computing device of a first participant that serves as a central distributor of video content during the video conference:

receiving at least one inter-encoded video image from a second participant;

detecting a condition that an expected inter-encoded video image has not been received from a third participant;

requesting an intra-encoded video image from the third participant;

receiving the requested intra-encoded video image; and transmitting a composite video image comprising the received intra-encoded image of the third participant to at least said second participant.

34. The method of claim 33, wherein said expected inter-encoded video image is a P frame, wherein said requested intra-encoded video image is an I frame.

35. The method of claim 33, wherein the transmitted composite video image further comprises inter-encoded video images from at least one other participant from the plurality of participants.

36. A computer readable medium storing a computer program for encoding an image during a video conference with multiple participants, the computer program comprising sets of instructions for:

generating a composite image comprising at least two sub-images for at least two participants; and constraint encoding each sub-image separately, wherein said constraint encoding comprises encoding each sub-image based on a set of constraints that allow the encoding of the sub-image to be independent of the encoding of any other sub-image.

37. A computer readable medium storing a computer program for distributing video in a video conference between at least two participants, the computer program comprising sets of instructions for:

detecting a condition requiring refreshing of a first participant's image data through intra-block encoded data;

intra-block encoding a portion of a first image of the first participant;

transmitting the intra-block encoded portion of the first image to a second participant;

intra-block encoding a first portion of a second image of the first participant; and transmitting the intra-block encoded portion of the second image to the second participant, wherein the intra-block encoded portions of the first and second images at least partially refresh the first participant's image data.

38. A computer readable medium storing a computer program for distributing video in a video conference between at least two participants, the computer program comprising sets of instructions for:

storing a long-term reference frame at a first participant;

notifying a second participant that the first participant has dropped video data transmitted by the second participant; and receiving, from the second participant, inter-encoded data, wherein the inter-encoded data is defined by reference to the long term reference frame.

39. A computer readable medium storing a computer program for distributing video content in a video conference having a plurality of participants, the computer program comprising sets of instructions for:

at a computing device of a first participant that serves as a central distributor of video content during the video conference:

receiving at least one inter-encoded video image from a second participant;

detecting a condition that an expected inter-encoded video image has not been received from a third participant;

requesting an intra-encoded video image from the third participant;

receiving the requested intra-encoded video image; and transmitting a composite video image comprising the received intra-encoded image of the third participant to at least said second participant.

* * * * *

UNITED STATES PATENT AND TRADEMARK OFFICE
CERTIFICATE OF CORRECTION

| | | |
|---|---|---|
| PATENT NO. | : 7,692,682 B2 | Page 1 of 1 |
| APPLICATION NO. | : 11/118615 | |
| DATED | : April 6, 2010 | |
| INVENTOR(S) | : Thomas Pun et al. | |

It is certified that error appears in the above-identified patent and that said Letters Patent is hereby corrected as shown below:

In column 2, line 33, after "embodiments" insert -- . --.

In column 3, line 54, before "participant" insert -- ( --.

In column 14, line 38, delete "by," and insert -- by --, therefor.

In column 23, line 48, in Claim 2, delete "operations," and insert -- operation, --, therefor.

Signed and Sealed this
Eighth Day of November, 2011

David J. Kappos
*Director of the United States Patent and Trademark Office*